(12) United States Patent
Baek

(10) Patent No.: US 12,537,713 B2
(45) Date of Patent: Jan. 27, 2026

(54) MOBILE DEVICE AND CONTROL METHOD FOR SAME

(71) Applicant: Samsung Electronics Co., Ltd., Suwon-si (KR)

(72) Inventor: Hojun Baek, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 23 days.

(21) Appl. No.: 18/612,227

(22) Filed: Mar. 21, 2024

(65) Prior Publication Data

US 2024/0275631 A1 Aug. 15, 2024

Related U.S. Application Data

(63) Continuation of application No. PCT/KR2022/014030, filed on Sep. 20, 2022.

(30) Foreign Application Priority Data

Sep. 24, 2021 (KR) .......................... 10-2021-0126715

(51) Int. Cl.
*H04L 12/28* (2006.01)
*G01S 13/02* (2006.01)
*G06F 1/3206* (2019.01)

(52) U.S. Cl.
CPC ...... *H04L 12/2818* (2013.01); *G01S 13/0209* (2013.01); *G06F 1/3206* (2013.01); *H04L 12/282* (2013.01)

(58) Field of Classification Search
None
See application file for complete search history.

(56) References Cited

U.S. PATENT DOCUMENTS

| 5,471,557 A | 11/1995 | Chung et al. |
| 8,519,881 B2 | 8/2013 | Park et al. |

(Continued)

FOREIGN PATENT DOCUMENTS

| JP | 5-325703 | 12/1993 |
| JP | 5756796 | 7/2015 |

(Continued)

OTHER PUBLICATIONS

International Search Report dated Dec. 23, 2022 in International Patent Application No. PCT/KR2022/014030.

(Continued)

*Primary Examiner* — Phyllis A Book
(74) *Attorney, Agent, or Firm* — STAAS & HALSEY LLP

(57) ABSTRACT

A method of controlling a mobile device, including determining, according to an output of a machine learning model based on a sensing value of an acceleration sensor, a state of the mobile device controlling a power of an ultrawide band (UWB) communication module based on the state of the mobile device determined according to the output of the machine learning model, determining, while the controlling controls the power of the UWB communication module to be turned on, a ranging interval based on a magnitude of acceleration of the mobile device, obtaining information associated with a distance between the mobile device and at least one home appliance by performing ranging through UWB communication module according to the ranging interval, and identifying at least one controllable home appliance based on the information associated with the distance.

20 Claims, 17 Drawing Sheets

(56) References Cited

U.S. PATENT DOCUMENTS

| | | | |
|---|---|---|---|
| 8,725,445 B2 | 5/2014 | Streibel | |
| 9,462,108 B2 | 10/2016 | Ko et al. | |
| 9,965,022 B2* | 5/2018 | Schneider | G06F 1/3287 |
| 10,171,129 B1 | 1/2019 | Hammerschmidt et al. | |
| 10,325,596 B1* | 6/2019 | Tran | G10L 15/1822 |
| 10,486,646 B2 | 11/2019 | Ledvina et al. | |
| 10,931,813 B1* | 2/2021 | Kim | G01P 15/16 |
| 11,019,195 B2 | 5/2021 | Ledvina et al. | |
| 2018/0133583 A1* | 5/2018 | Tran | G06F 3/00 |
| 2019/0187778 A1* | 6/2019 | Molnos | G06N 3/006 |
| 2020/0045163 A1* | 2/2020 | Hwang | H04M 1/72451 |
| 2020/0116373 A1* | 4/2020 | Guan | H05B 47/19 |
| 2021/0185283 A1* | 6/2021 | Kim | G08B 3/10 |
| 2021/0239338 A1* | 8/2021 | Shim | F25D 29/00 |
| 2022/0082676 A1 | 3/2022 | Lee et al. | |

FOREIGN PATENT DOCUMENTS

| | | | | |
|---|---|---|---|---|
| KR | 10-0202425 | | 6/1999 | |
| KR | 10-2013-0120359 | | 11/2013 | |
| KR | 10-1472912 | | 12/2014 | |
| KR | 10-2015-0129591 | | 11/2015 | |
| KR | 10-1637165 | | 7/2016 | |
| KR | 10-2017-0001434 | | 1/2017 | |
| KR | 10-2017-0004497 | | 1/2017 | |
| KR | 10-1809045 | | 12/2017 | |
| KR | 10-1923443 | | 11/2018 | |
| KR | 10-2019-0004240 | | 1/2019 | |
| KR | 10-2019-0041695 | | 4/2019 | |
| KR | 20190090368 A | * | 8/2019 | H04W 72/23 |
| KR | 20210077916 A | * | 6/2021 | G06N 3/08 |
| KR | 10-2021-0102273 | | 8/2021 | |
| KR | 10-2297848 | | 9/2021 | |
| KR | 10-2564520 | | 8/2023 | |

OTHER PUBLICATIONS

PCT/ISA/220 and PCT/ISA/237 dated Dec. 23, 2022 in International Patent Application No. PCT/KR2022/014030.

Song mi Lee et al., "Machine learning analysis for human action recognition based on 3-axis acceleration sensor" (Sep. 2016).

* cited by examiner

MOBILE DEVICE AND CONTROL METHOD FOR SAME

CROSS-REFERENCE TO RELATED APPLICATION

This application is a continuation application, under 35 U.S.C. § 111(a), of international application No. PCT/KR2022/014030, filed on Sep. 20, 2022, which claims priority under 35 U. S. C. § 119 to Korean Patent Application No. 10-2021-0126715, filed on Sep. 24, 2021, in the Korean Intellectual Property Office, the disclosures of which are incorporated by reference herein in their entireties.

TECHNICAL FIELD

Embodiments of the disclosure relate to a mobile device, a mobile device control method, and a computer-readable recording medium having recorded thereon a program for executing, on a computer, the mobile device control method.

BACKGROUND ART

Ultra wide band (UWB) communication is useful for measuring distances between devices. Home appliances also have a built-in UWB communication module including a UWB antenna to improve user convenience and communication performance, and mobile devices with a built-in UWB communication module may also perform UWB communication with home appliances to control the home appliances more easily. Specifically, a mobile device with a built-in a UWB communication module may perform UWB communication with home appliances to identify a distance between the mobile device and the home appliances and locations of the home appliances, and use this to more easily control the home appliances.

However, when the mobile device has a built-in UWB communication module, power of the mobile device may be consumed unnecessarily due to the UWB communication module. Thus, there is demand for a method for reducing unwanted power consumption due to the UWB communication module in mobile devices.

DISCLOSURE

Technical Problem

Embodiments of the disclosure are to provide a mobile device for reducing power consumption due to ultra wide band (UWB) communication in a process of the mobile device controlling home appliances by using the UWB communication, and a control method therefor.

Technical Solution

According to an aspect of an embodiment of the disclosure, provided is a method of controlling a mobile device. The method may include determining, according to an output of a machine learning model based on a sensing value of an acceleration sensor, controlling a power of an ultra-wide band (UWB) communication module based on the state of the mobile device determined according to the output of the machine learning model, determining, while the controlling controls the power of the UWB communication module to be turned on, a ranging interval based on a magnitude of acceleration of the mobile device, obtaining information associated with a distance between the mobile device and at least one home appliance by performing ranging through UWB communication according to the ranging interval, and identifying at least one controllable home appliance based on the information associated with the distance.

In addition, according to an embodiment of the disclosure, the machine learning model may include a fully connected neural network (FCNN) model that receives the sensing value of the acceleration sensor and outputs information associated with the state of the mobile device.

In addition, according to an embodiment of the disclosure, the state of the mobile device is one of a moving state, a vibration state, or a stationary state, and the controlling of the power of the UWB communication module may include turning on the power of the UWB communication module based on the state of the mobile device being the moving state or the vibration state.

In addition, according to an embodiment of the disclosure, the method for controlling a mobile device may further include changing a turned-on mode of the UWB communication module to a power saving mode based on the state of the mobile device being the vibration state.

In addition, according to an embodiment of the disclosure, the determining of the ranging interval may include determining the magnitude of acceleration of the mobile device based on a new sensing value of the acceleration sensor in association with a movement of the mobile device, and determining the ranging interval to be inversely proportional to the magnitude of the acceleration.

In addition, according to an embodiment of the disclosure, the method of controlling a mobile device may further include identifying, based on the information associated with the distance, a first home appliance located along a direction in which the mobile device faces from among the at least one controllable home appliance, and displaying a first user interface (UI) to control the first home appliance.

In addition, according to an embodiment of the disclosure, where the direction in which the mobile device is a first direction, and the method of controlling a mobile device may further include identifying, based on the first direction in which the mobile device faces changing to a second direction, a home appliance located along the second direction, and changing the displayed first UI to a second UI to control the home appliance located along the second direction.

In addition, according to an embodiment of the disclosure, the method of controlling a mobile device may further include receiving an input to fix the displayed first UI on a partial area of a screen, wherein the first UI fixed on the partial area of the screen may unchanged to another UI until a release input is received.

In addition, according to an embodiment of the disclosure, the method of controlling a mobile device may further include identifying, based on the information associated with the distance, a second home appliance located around the first home appliance from among the at least one controllable home appliance, and displaying a second UI indicating the second home appliance.

In addition, according to an embodiment of the disclosure, the method of controlling a mobile device may further include displaying a UI to control the second home appliance, based on an input for the second UI indicating the second home appliance.

According to another aspect of an embodiment of the disclosure, a mobile device includes a communication module comprising an ultra wide band (UWB) communication module, an acceleration sensor, a memory to store at least one instruction, and at least one processor to execute the at least one instruction stored in the memory to: determining, according to an output of a machine learning model based on a sensing value of an acceleration sensor, a state of the mobile device, to control power of the UWB communication module based on the movement state of the mobile device, to determine, while the power of the UWB communication module is being controlled by the controlling to be turned on, a ranging interval based on a magnitude of acceleration of the mobile device, to obtain information associated with a distance between the mobile device and at least one home appliance by performing ranging through UWB communication module according to the ranging interval, and to identify at least one controllable home appliance based on the information associated with the distance.

According to another aspect of an embodiment of the disclosure, provided is a non-transitory computer-readable recording medium having recorded thereon a program for performing, on a computer, a method of controlling a home appliance.

BEST MODE

Mode for Invention

Figure 1:
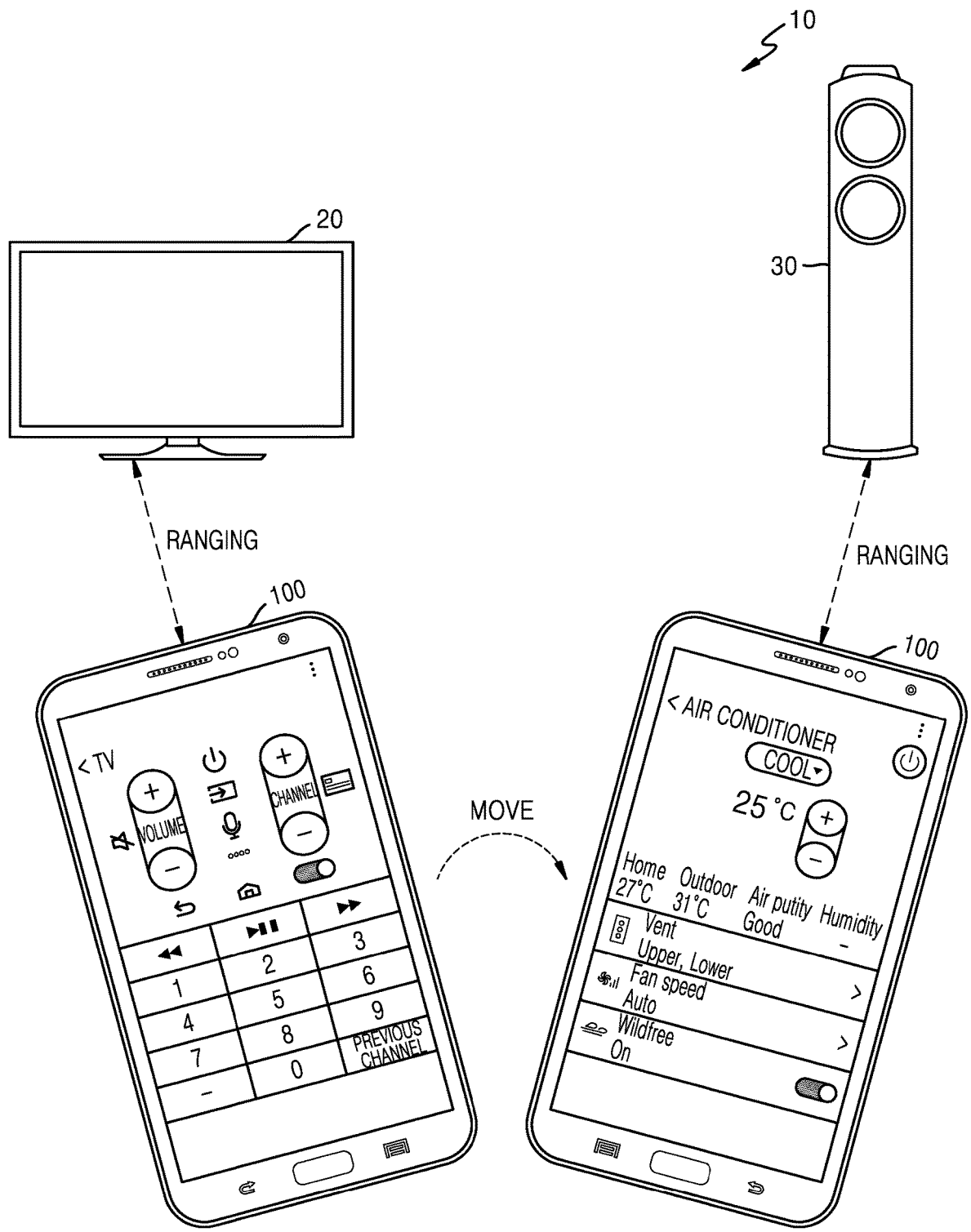
FIG. 1 is a diagram illustrating a home appliance control system using a mobile device, according to an embodiment of the disclosure.

The present specification clarifies the scope of the claims and describes and discloses the principles of embodiments so that a person having ordinary skill in the art could practice the embodiments described in the claims. The disclosed embodiments may be implemented in various forms.

Like reference characters refer to like elements throughout the specification. The present specification does not describe all elements of embodiments, and general content or redundant descriptions between embodiments in the technical field to which embodiments of the disclosure pertain are omitted. The terms "module" or "unit" used in the specification may be implemented as one or a combination of software, hardware, or firmware, and depending on the embodiments, a plurality of "modules" or "units" may be implemented as one element, or one "module" or "unit" may include a plurality of elements.

In describing embodiments, when it is determined that detailed descriptions of related known technologies may unnecessarily obscure the gist of the present disclosure, detailed descriptions thereof are omitted. In addition, numbers (for example, first, second, etc.) used in the description of the specification are merely identifiers to distinguish one element from another element.

In addition, in the present specification, when it is mentioned that an element is "connected" or "accessed" to another element, the element may be directly connected or directly accessed to the other element, but it should be construed that, unless there is a contrary description, the connection or access may be performed through another element therebetween.

Hereinafter, an operating principle and various embodiments of embodiments of the disclosure are described with reference to the accompanying drawings.

FIG. 1 is a diagram illustrating a home appliance control system using a mobile device, according to an embodiment of the disclosure.

A home appliance control system 10 according to an embodiment of the disclosure may include a mobile device 100 and home appliances 20 and 30. The mobile device 100 may remotely control home appliances and may be implemented in various forms. For example, the mobile device 100 described in the disclosure may be a remote controller for a home appliance, a remote controller for integrated control of a plurality of home appliances, a mobile terminal, etc., but is not disclosed thereto. In addition, the mobile terminal may include smartphones, laptop computers, tablet personal computers (PCs), digital cameras, e-book terminals, digital broadcasting terminals, personal digital assistants (PDAs), portable multimedia players (PMPs), navigations, MPEG Audio Layer 3 (MP3) players, etc., but are not limited thereto. For example, a mobile terminal may be a wearable device that may be worn by a user. The wearable device may include at least one of accessory-type devices (e.g., watches, rings, bracelets, anklets, necklaces, glasses, and contact lenses), head-mounted devices (HMDs), textile or clothing-integrated devices (e.g., electronic garments), body attachable-type devices (e.g., skin pads), or bioimplantable devices (e.g., implantable circuits). The home appliances 20 and 30 may include refrigerators, air purifiers, air conditioners, audio devices, induction cookers, washing machines, dryers, clothes care machines, televisions (TVs), dishwashers, ovens, microwave ovens, air fryers, automatic feeders for pets, water purifiers, lighting devices, bidets, etc., but are not limited thereto.

The mobile device 100 according to an embodiment of the disclosure may identify the home appliances 20 and 30 through ranging technology of ultra wideband (UWB) communication. The ranging technology refers to a technology that measures a distance of a device located far from an observation point or reference point through UWB communication. Here, devices that perform ranging include UWB antennas and are capable of performing UWB communication. Distance measurement using ranging technology may be performed by calculating a time difference between UWB signals transmitted and received between devices performing ranging. For example, when the mobile device 100 or a UWB antenna of the mobile device 100 is a reference point, the mobile device 100 may measure distances from the mobile device 100 to the home appliances 20 and 30 through ranging. In addition, through ranging, a direction in which a distant object is located on two-dimensional or three-dimensional coordinates may be measured relative to the reference point. In addition, through ranging, it may be measured whether there is a device in a remote distance (e.g., in a direction in which the mobile device 100 faces, or in the Line of Sight (LoS)) from a device performing ranging, or within what angle the device is located in the direction in which the mobile device 100 faces. Hereinafter, in the disclosure, the ranging technology is referred to as ranging or UWB ranging.

Hereinafter, an embodiment of the mobile device 100 and the home appliances 20 and 30 performing ranging is discussed with reference to FIG. 1. The mobile device 100 may identify a TV 20 as a controllable home appliance by performing ranging with the TV 20 through UWB communication, and display a user interface (UI) for controlling the identified TV 20. The mobile device 100 may perform ranging, and when the identified home appliance is located within a certain distance from the mobile device 100 or a preset reference point, determine that the identified home appliance is controllable. The mobile device 100 may perform ranging through UWB communication while moving, and identify an air conditioner 30 by performing ranging with the air conditioner 30. The mobile device 100 may change, based on a result of performing ranging, a UI for controlling the TV 20 to a UI for controlling the identified air conditioner 30.

The mobile device 100 may precisely detect a distance between the mobile device 100 and home appliances, a direction in which the home appliances are located, etc., through ranging technology using UWB communication. Through this, the mobile device 100 may identify controllable home appliances and determine which home appliance to control. However, power consumption of the mobile device 100 may be unnecessarily increased due to a UWB communication module used for UWB communication. For example, even when it is not necessary to perform ranging through UWB communication because it is not necessary to identify a new home appliance, such as when the mobile device 100 is not in use and stopped, or when the mobile device 100 is in use in place, power may be wasted due to an operation of the UWB communication module. Embodiments of the disclosure disclose a method for reducing power consumed for UWB communication based on a movement state of the mobile device 100, a magnitude of acceleration, etc., so as to prevent a situation in which power is wasted through unnecessary UWB communication.

Figure 2:
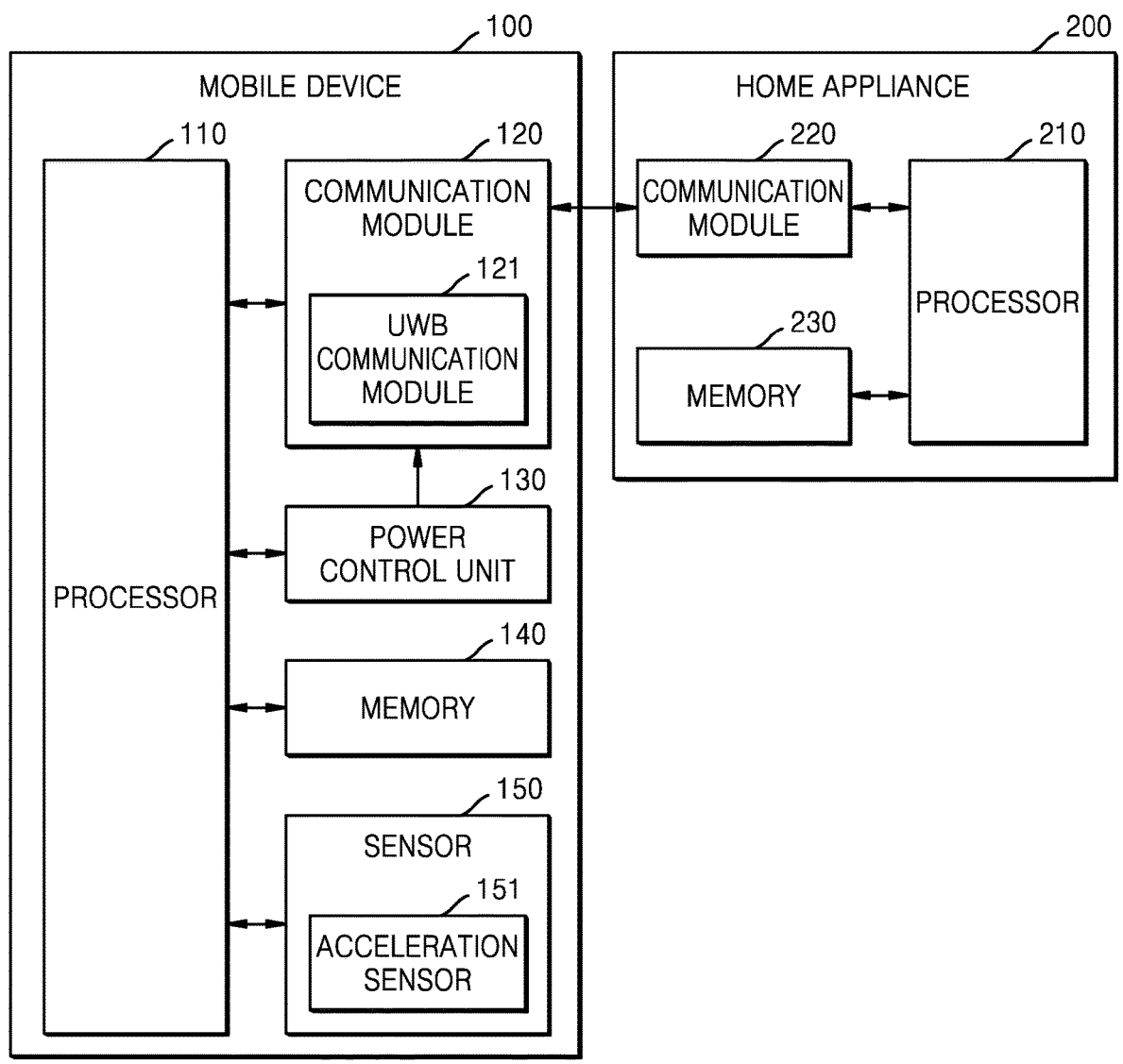
FIG. 2 is a diagram illustrating a mobile device and a home appliance, according to an embodiment of the disclosure.

FIG. 2 is a diagram illustrating a mobile device and a home appliance according to an embodiment of the disclosure.

According to an embodiment of the disclosure, the mobile device 100 may include a processor 110, a communication module 120, a power control unit 130, a memory 140, and a sensor 150.

The communication module 120 may communicate with an external device wired or wirelessly. The communication module 120 may communicate with a home appliance 200. The communication module 120 may communicate with the home appliance 200 through a short-range communication scheme.

The communication module 120 may include a wireless communication module (e.g., a cellular communication module, a near field communication module, or a global navigation satellite system (GNSS) communication module) or a wired communication module (e.g., a local area network (LAN) communication module or a power line communication module). In addition, the communication module 120 may perform short-range communication, and for example, UWB, Bluetooth, Bluetooth Low Energy (BLE), short-range wireless communication (near field communication), wireless LAN (WLAN), Zigbee, infrared Data Association (IrDA) communication, Wi-Fi Direct (WFD), Ant+ communication, etc. may be used. In another example, the communication module 120 may perform long-distance communication, and may communicate with an external device through, for example, a legacy cellular network, a 5th generation (5G) network, a next-generation communication network, the Internet, or a computer network (e.g., LAN or wide area network (WAN)).

The communication module 120 may establish communication with the home appliance 200 under the control of the processor 110. The communication module 120 may transmit control signals and data to the home appliance 200 or receive control signals and data from the home appliance 200. The communication module 120 may include a UWB communication module configured to perform ranging through UWB communication. A UWB communication module 121 may perform UWB communication with the home appliance 200. The UWB communication refers to a communication technology for transmitting and receiving signals in an ultra wideband, and may use pulse waves instead of carrier waves, and this allows distance measurement with small errors. The UWB communication module 121 may perform ranging according to a ranging interval. The ranging interval may refer to a period during which the UWB communication module 121 performs ranging, and a transmission/reception period of a signal for ranging may be determined according to the ranging interval. The smaller the ranging interval, the shorter the ranging period, and thus, the accuracy of distance measurement may increase and power consumption may increase.

The power control unit 130 may control power necessary for an operation of the mobile device 100. The power control unit 130 may be implemented as an ON/OFF switch. The power control unit 130 may control power supplied to the processor 110, the communication module 120, the memory 140, and the sensor 150, under the control of the processor 110. The power control unit 130 may be directly connected to the UWB communication module 121 to control power of the UWB communication module 121.

The memory 140 may store various information, data, instructions, programs, etc. necessary for an operation of the mobile device 100. The memory 140 may include at least one of volatile memory or non-volatile memory, or a combination thereof. The memory 140 may include at least one type of storage medium from among a flash memory type, a hard disk type, a multimedia card microtype, a card-type memory (for example, Secure Digital (SD) or eXtreme Digital (XD) memory, etc.), random access memory (RAM), static random access memory (SRAM), read-only memory (ROM), electrically erasable programmable read-only memory (EEPROM), programmable read-only memory (PROM), magnetic memory, magnetic disk, and an optical disk. In addition, the memory 140 may correspond to a web storage or cloud server performing a storage function on the Internet.

The sensor 150 may include an acceleration sensor 151. The acceleration sensor 151 may output a sensing value for movement of the mobile device 100 as values in directions of the x, y, and z axes.

According to an embodiment of the disclosure, the home appliance 200 may include a processor 210, a communication module 220, and a memory 230. The home appliance 200 may be an electronic device that performs a certain function. The home appliance 200 may be arranged at a certain location within a home. The home appliance 200 may include, for example, refrigerators, kimchi refrigerators, washing machines, TVs, air conditioners, air purifiers, cleaning robots, vacuum cleaners, clothes care machines, ovens, microwave ovens, induction cookers, audio output devices, or smart home hub devices, etc.

The home appliance 200 may have a certain home appliance function module and perform an original function thereof. For example, the home appliance function module may include a cooler, container, door, temperature sensor, door open/close sensor, light, etc. provided in a refrigerator. In another example, the home appliance function module may include a washing tub, motor, door, door open/close sensor, water supply unit, drain unit, etc. provided in a washing machine. In another example, the home appliance function module may include a vacuum suction assembly, dust bin, brush, etc. provided in a vacuum cleaner.

The processor 210 may control an overall operation of the home appliance 200. The processor 210 may be implemented as one or more processors. The processor 210 may perform a certain function by executing instructions or commands stored in the memory 230. In addition, the processor 210 may control operations of the elements provided in the home appliance 200.

The communication module 220 may communicate with an external device wired or wirelessly. The communication module 220 may communicate with the mobile device 100. The communication module 220 may communicate with the mobile device 100 by using a short-range communication scheme. For example, the communication module 220 may communicate with the mobile device 100 through Bluetooth, BLE, or Wi-Fi communication connection. In addition, the communication module 220 may communicate with a server by using a long-distance communication scheme.

The communication module 220 may include a wireless communication module (e.g., a cellular communication module, a near field communication module, or a GNSS communication module) or a wired communication module (e.g., a LAN communication module or a power line communication module). In addition, the communication module 212 may perform short-range communication, and for example, Bluetooth, BLE, short-range wireless communication (near field communication), WLAN (Wi-Fi), Zigbee, IrDA communication, WFD, UWB, Ant+ communication, etc. may be used. In another example, the communication module 220 may perform long-distance communication, and may communicate with an external device through, for example, a legacy cellular network, a 5G network, a next-generation communication network, the Internet, or a computer network (e.g., LAN or WAN).

The communication module 220 may establish communication with the mobile device 100 under the control of the processor 210. In addition, the communication module 220 may transmit control signals or data to the mobile device 100 or receive control signals and data from the mobile device 100.

Figure 3:
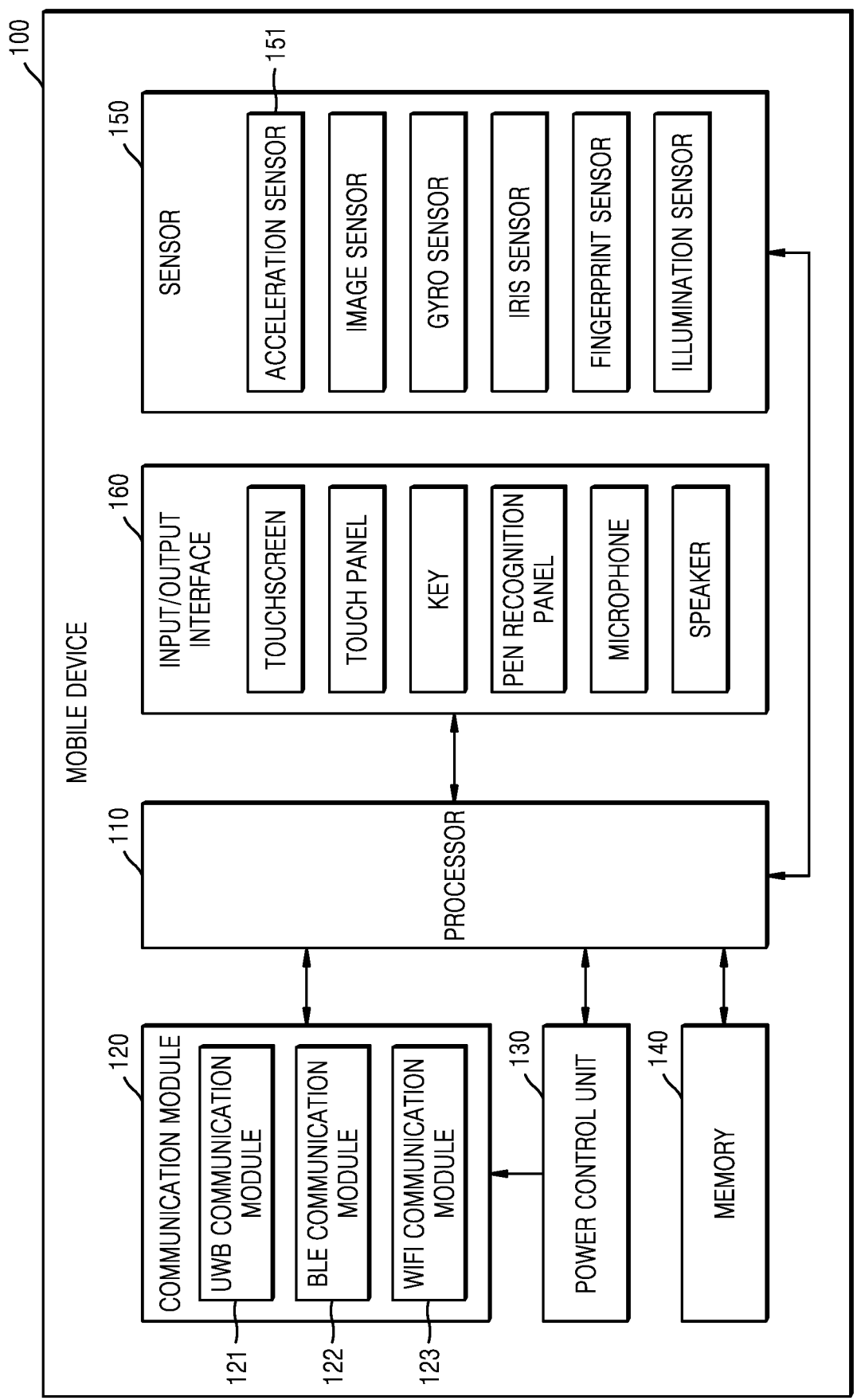
FIG. 3 is a diagram illustrating a structure of a mobile device, according to an embodiment of the disclosure.

FIG. 3 is a diagram illustrating a structure of a mobile device according to an embodiment of the disclosure.

A mobile device 100 according to an embodiment of the disclosure may include a processor 110, a communication module 120, a power control unit 130, a memory 140, a sensor 150, and an input/output interface 160.

The communication module 120 according to an embodiment may include a UWB communication module 121, a BLE communication module 122, and a WiFi communication module 123. According to an embodiment, the UWB communication module 121 may be implemented as an individual chipset from the BLE communication module 122 and the WiFi communication module 123. The BLE communication module 122 and the WiFi communication module 123 may be implemented as a single chipset or individual chipsets. The UWB communication module 121 may be turned on or off independently of the BLE communication module 122 and the WiFi communication module 123. Thus, The UWB communication module 121 may be in a turn-off state even when the mobile device 100 performs BLE communication and/or Wi-Fi communication, and through this, power consumption due to the UWB communication module 121 may be reduced.

The WiFi communication module 123 and the BLE communication module 122 may transmit and receive control signals or data to and from the home appliance 200 through Wi-Fi communication and Bluetooth communication, respectively. The home appliance 200 configured to transmit and receive signals through Wi-Fi or Bluetooth communication may be a home appliance identified to be controllable by the mobile device 100.

According to an embodiment, the input/output interface 160 may receive, from the outside of the mobile device 100 (e.g., a user), commands or data to be used by an element (e.g., the processor 110) of the mobile device 100. The input/output interface 160 may include a touchscreen, a touch panel, a key, a pen recognition panel, a microphone, a speaker, etc. The mobile device 100 may provide various types of output for controlling the home appliance 200, through the input/output interface 160. For example, the mobile device 100 may display a UI for controlling the home appliance 200, through the touchscreen. In addition, the mobile device 100 may receive an input for a UI displayed through the touchscreen, and the processor 110 may control the home appliance 200 by using the input for the UI.

According to an embodiment, the sensor 150 may further include an image sensor, a gyro sensor, an iris sensor, a fingerprint sensor, an illumination sensor, etc. in addition to the acceleration sensor 151. User authentication may be performed by using an image sensor, an iris sensor, a fingerprint sensor, etc. In addition, the gyro sensor may be interlocked with the acceleration sensor 151, and may be used to more precisely measure movement of the mobile device 100 than when only the acceleration sensor 151 is used.

Figure 4:
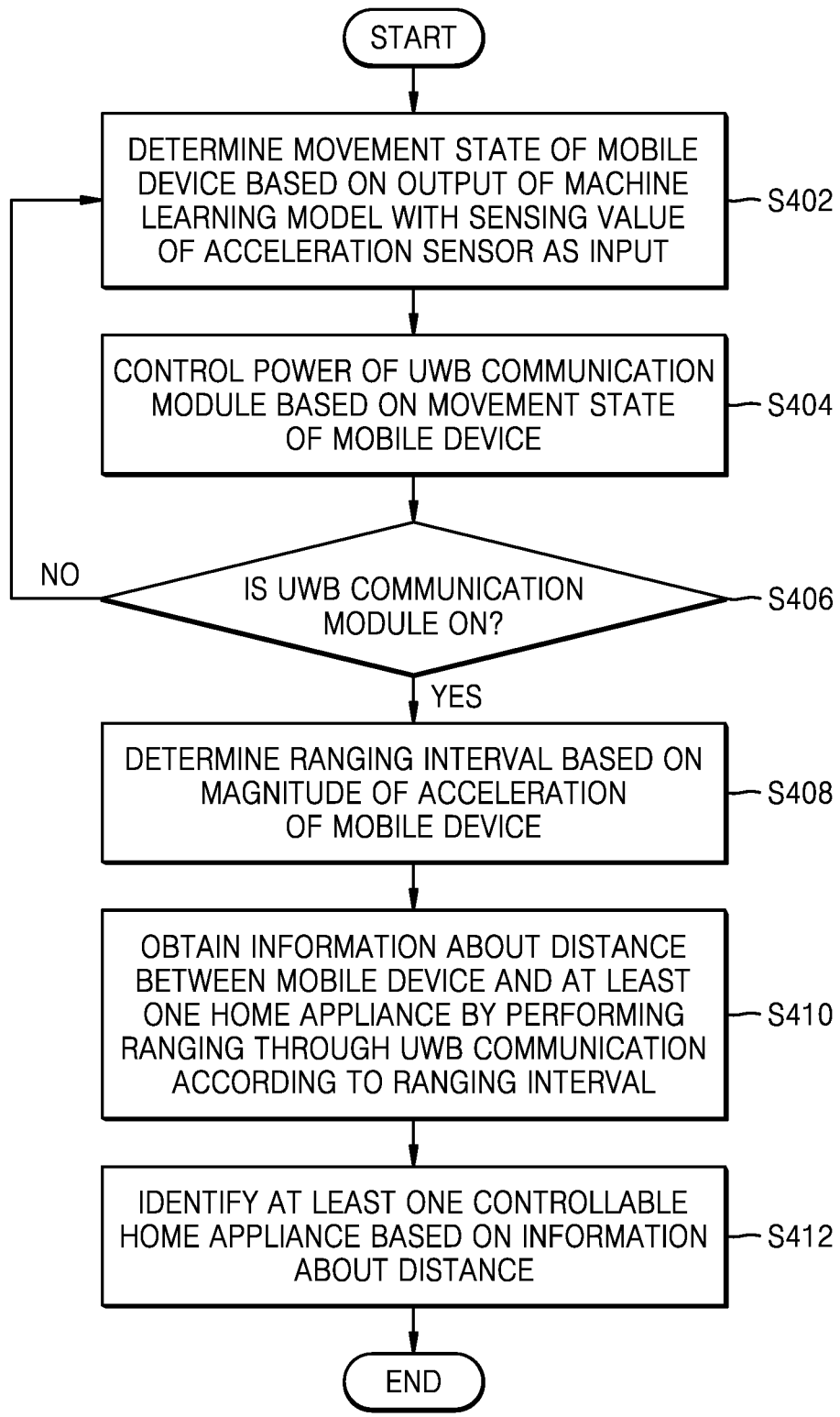
FIG. 4 is a flowchart of a control method for a mobile device, according to an embodiment of the disclosure.

FIG. 4 is a flowchart of a control method for a mobile device, according to an embodiment of the disclosure.

Each operation of a mobile device control method according to an embodiment of the disclosure may be performed by an electronic device of various types that communicates with the home appliance 200. In the disclosure, an embodiment in which the mobile device 100 according to embodiments of the disclosure performs a mobile device control method is mainly described. Accordingly, embodiments described for the mobile device 100 may be applicable to embodiments for a mobile device control method, and conversely, embodiments described for a mobile device control method may be applicable to embodiments for the mobile device 100. A mobile device control method according to disclosed embodiments is performed by the mobile device 100 disclosed in the disclosure, is not limited in terms of embodiments, and may be performed by electronic devices of various types.

In operation S402, the mobile device 100 may input a sensing value of an acceleration sensor to a machine learning model, and determine a movement state of the mobile device 100 based on an output of the machine learning model.

The mobile device 100 may control the acceleration sensor and obtain sensing values for movement of the mobile device 100. The sensing value for the movement of the mobile device 100 may include sensing values for a magnitude of acceleration in directions of x, y, and z axes (for example, (x, y, z)). The machine learning model may receive the sensing values from the acceleration sensor and output information about the movement state of the mobile device 100. According to an embodiment, the machine learning model may be a fully connected neural network (FCNN) model trained to receive sensing values from the acceleration sensor and output information about a movement state of the mobile device 100.

Figure 5:
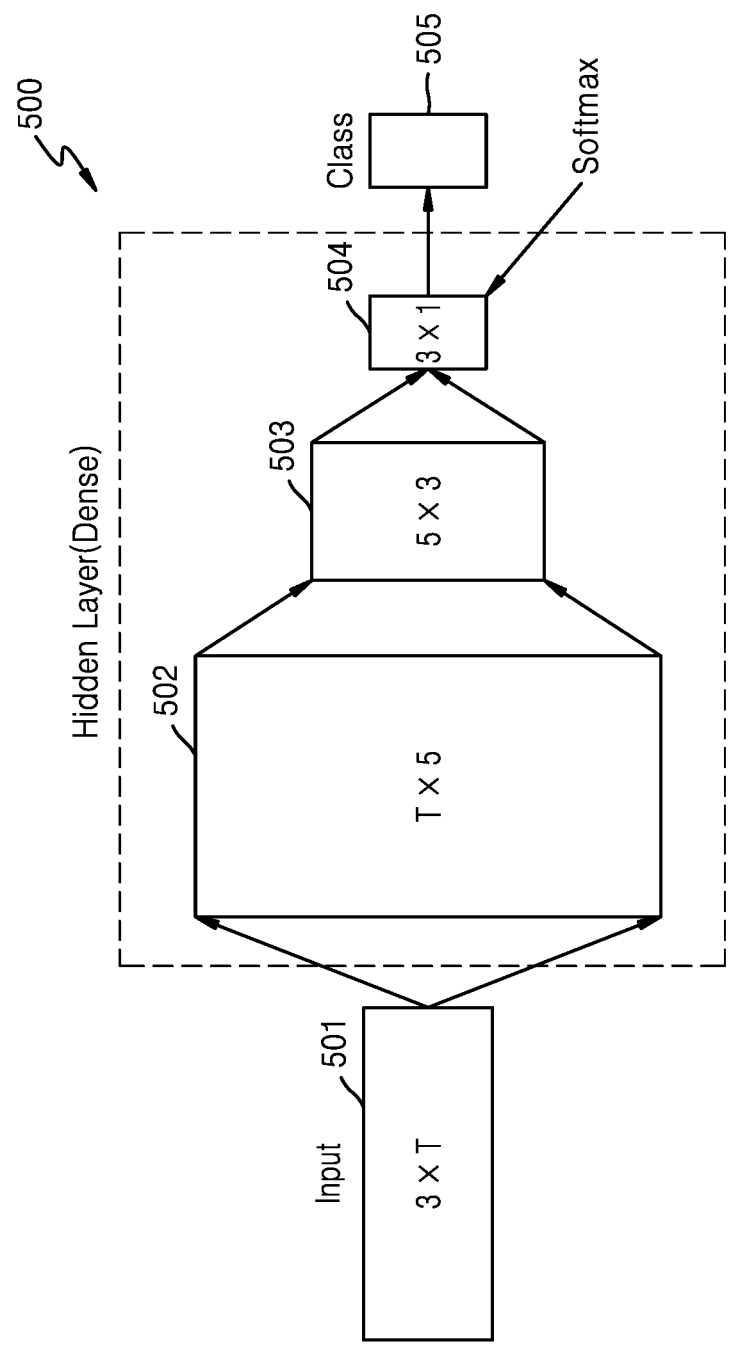
FIG. 5 is a diagram illustrating a structure of a machine learning model used to determine a movement state of a mobile device, according to an embodiment of the disclosure.

Referring to FIG. 5, an FCNN module 500 according to an embodiment may be a network model in a state in which all nodes of one layer are connected to all nodes of a next layer. The FCNN module 500 may receive a [3×T] matrix for the sensing value (x, y, z) of the acceleration sensor and time (T) as input data 501. The time T may be set to a specific time period, and the sensing values (x, y, z) of the acceleration sensor of the input data 501 may be values obtained during T.

Each of layers 502 and 503 of the FCNN module 500 may include a weighted sum and a rectified linear unit (RELU)

$$f(x) = \begin{cases} 0 & x < 0 \\ x & x \geq 0 \end{cases},$$

and the last layer 504 may include softmax $$\text{softmax}(x_i) = \frac{\exp(x_i)}{\sum_{j=1}^{n} \exp(x_j)}$$

and output a probability value for each class as output data 505. Sizes of layers of the FCNN module 500 may change depending on the number of classes corresponding to probability values desired to be obtained from the output data 505. FIG. 5 is an example in which classes are classified into three classes, as the number of classes decreases or increases, the sizes of the layers of the FCNN module 500 may also decrease or increase.

A probability value for each class, which is the output data 505 of the FCNN module 500, may represent information about a movement state of a mobile device. According to an embodiment, the movement state of the mobile device may be one of a moving state, a vibration state, or a stationary state. The respective classes corresponding to the probability values included in output data 404 may represent a moving state, a vibration state, or a stationary state. The movement state of the mobile device is not limited to the examples described above and may include movement states subdivided into a rotation state, movement state in a specific direction, etc., and accordingly, the classes of the output data 505 of the FCNN module 500 may also be defined.

The mobile device 100 may determine the movement state of the mobile device 100 according to a class corresponding to the highest probability value in the output data 505 of the FCNN module 500. For example, when a probability value for the movement class is the largest among the three classes (moving, vibration, or stationary) of the output data 505, the mobile device 100 may determine the movement state of the mobile device 100 to the moving state.

The FCNN module 500 is used for simple data classification, and a weighted sum of each layer is calculated by multiplying small matrices, and thus, an amount of calculation is small. Accordingly, by using the FCNN module 500 according to the disclosure, simple data may be classified into classes with a small amount of calculation.

In operation S404, the mobile device 100 may control power of the UWB communication module based on the movement state of the mobile device 100.

According to an embodiment, when the movement state of the mobile device 100 is a moving state or vibration state, the mobile device 100 may turn on the power of the UWB communication module. When the mobile device 100 is in the moving state or vibration state, the user of the mobile device 100 may be using the mobile device 100. Accordingly, the mobile device 100 may turn on the power of the UWB communication module to identify the home appliance 200 to control.

According to an embodiment, when the movement state of the mobile device 100 is in the vibration state, the mobile device 100 may change the turned-on UWB communication module to a power saving mode. When the mobile device 100 is in the vibration state, a movement range of the mobile device 100 may be narrow. In other words, in a state in which a direction in which the mobile device 100 faces is within a certain range, the mobile device 100 may be moving. When the mobile device 100 is facing within a certain range, the mobile device 100 may easily perform UWB communication (or, UWB ranging) with the home appliance 200 located within the certain range even when UWB communication performance is low. Accordingly, in the vibration state, the mobile device 100 may change the UWB communication module to a power saving mode and reduce power consumption at the cost of lowering UWB communication performance. Here, the power saving mode of the UWB communication module may include at least one of a mode using one antenna channel from among a plurality of UWB antenna channels, a mode transmitting a UWB communication signal at low power, or a mode reducing a waiting time for receiving a UWB communication signal. However, the power saving mode of the UWB communication module is not limited thereto and may include various modes for the UWB communication module to operate at low power.

According to an embodiment, the power of the UWB communication module of the mobile device 100 may be controlled by using a power switch. For example, the power of the UWB communication module may be controlled by using switches such as general-purpose input/output (GPIO) ports. The GPIO ports interlocked with software may be used to control the power of the UWB communication module by receiving or outputting electrical input. According to an embodiment, the UWB communication module may be changed to a power saving mode through UWB command interface (UCI). The UCI may follow what is defined in the technical requirements for UWB of the Fine Ranging (FiRa) Consortium. The mobile device 100 may control the UWB communication module by simplifying interface for application-level software by using the UCI.

In operation S406, the mobile device 100 may identify whether the power of the UWB communication module is on. When the power of the UWB communication module is on in operation S404, the mobile device 100 may perform operation S406. When the power of the UWB communication module is not on in operation S404, the mobile device 100 may perform again from operation S402.

According to an embodiment, when the power of the UWB communication module is on, the mobile device 100 may stop inputting the sensing values of the acceleration sensor to the machine learning model. The machine learning model of the mobile device 100 may be used to control the power of the UWB communication module by determining the movement state of the mobile device 100. Thus, when the power of the UWB communication module is on, unnecessary computation and power consumption may be reduced by stopping the determination process for the movement state of the mobile device 100 through the machine learning model.

In operation S408, when the power of the UWB communication module is on, the mobile device 100 may determine a ranging interval based on the magnitude of acceleration of the mobile device 100.

According to an embodiment, the ranging interval may refer to a period during which the mobile device 100 performs ranging. The mobile device 100 may transmit a ranging signal through the UWB communication module according to the ranging interval, and perform ranging by receiving, from the home appliance 200, a response signal thereto. The ranging signal transmitted from the mobile device 100 may include a ranging initiation message, and the response signal may include a ranging response message. A specific ranging method may follow the technical requirements for UWB of the FiRa Consortium.

According to an embodiment, the mobile device 100 may determine the ranging interval to be inversely proportional to the magnitude of acceleration of the mobile device 100. The greater the magnitude of acceleration of the mobile device 100, the faster it may be determined that the mobile device 100 is moving. When the mobile device 100 moves quickly, the user may desire to search for the home appliance 200 by using the mobile device 100. In addition, the faster the mobile device 100 moves, the less time it takes for the mobile device 100 to perform ranging with home appliances located in a direction in which the mobile device 100 is directed on a moving path of the mobile device 100. Accordingly, the faster the mobile device 100 moves, the more precisely it is necessary to perform ranging with home appliances on the moving path. Because ranging precision may be increased as the ranging interval decreases, the mobile device 100 may determine the ranging interval so that as the magnitude of acceleration increases, the ranging interval decreases.

Figure 6:
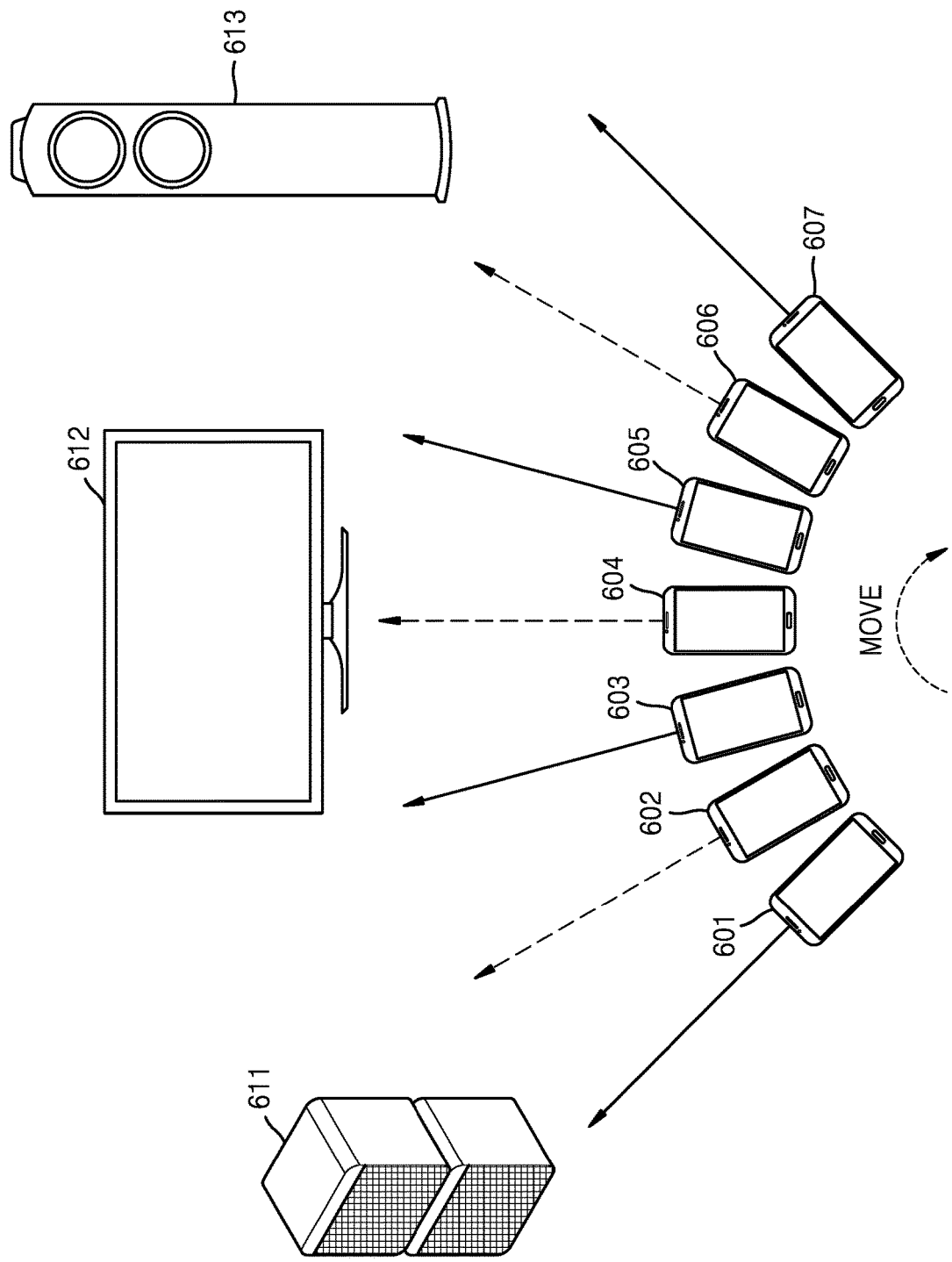
FIG. 6 is a diagram illustrating an example of a mobile device performing ranging according to ranging intervals, according to an embodiment of the disclosure.

A specific example of the above is described below. Referring to FIG. 6, the mobile device 100 may move from 601 to 607. While the mobile device 100 moves, home appliance A 611, home appliance B 612, and home appliance C 613 may be located in a direction in which the mobile device 100 faces. Assuming that the mobile device 100 performs ranging at a specific ranging interval, when the mobile device 100 is moving slow (i.e., when the magnitude of acceleration is small), ranging may be performed at locations 601 to 607. On the other hand, when the mobile device 100 is moving quickly (i.e., when the magnitude of acceleration is large), ranging may be performed at locations 601, 603, 605, and 607. The mobile device 100 may perform ranging with the home appliance A 611 at location 601 both when moving slowly and when moving quickly. The mobile device 100 may perform ranging with the home appliance B 612 both when moving slowly and when moving quickly, but when moving slowly, ranging may be performed more at position 604 than when moving quickly, resulting in higher ranging precision. In addition, when moving quickly, the mobile device 100 cannot perform ranging with the home appliance C 613 at location 606, and thus may not recognize the home appliance C 613. Accordingly, when the mobile device 100 is moving quickly, the mobile device 100 may perform ranging more precisely by reducing the ranging interval even when power consumption increases, and when moving slowly, because ranging may be performed with sufficient precision even when the ranging interval is large, power consumption may be reduced by increasing the ranging interval.

According to an embodiment, in order to determine the magnitude of acceleration of the mobile device 100, the mobile device 100 may obtain new sensing values of the acceleration sensor for the movement of the mobile device 100. The newly obtained sensing values may be a value newly obtained from the acceleration sensor in a state in which the UWB communication module of the mobile device 100 is turned on. The mobile device 100 may calculate the magnitude of acceleration by using the new sensing values. For example, when the new sensing values for the movement of the mobile device 100 is (x1, x2, x3), the magnitude a of acceleration of the mobile device 100 may be calculated as in $a=\sqrt{x1^2+x2^2+x3^2}$. The mobile device 100 may determine a ranging interval according to the determined magnitude of the acceleration. The ranging interval may be preset in the form of a table according to the magnitude of acceleration, and when the magnitude of acceleration is determined, the ranging interval may be determined according to the preset value.

In operation S410, the mobile device 100 may obtain information about a distance between the mobile device 100 and at least one home appliance by performing ranging through UWB communication according to the ranging interval.

According to an embodiment, the mobile device 100 may perform ranging through UWB communication according to the determined ranging interval. As a result of performing ranging on the moving path, the mobile device 100 may obtain a measurement value for a distance between the mobile device 100 and the home appliance 200 that performs ranging. When the mobile device 100 performs ranging with a plurality of home appliances on the moving path, a measurement value for a distance between the mobile device 100 and each of the plurality of home appliances may be obtained as a result of the ranging. In addition, as a result of performing ranging, the mobile device 100 may obtain a measurement value for a direction of the home appliance that performs ranging together with the measurement value for the distance. The measurement value for the direction of the home appliance may be a measurement value of a direction in which the mobile device 100 faces or a direction relative to the LoS.

According to an embodiment, the mobile device 100 may obtain information about a location of the home appliance 200 based on the measurement values obtained as a result of performing ranging. For example, the mobile device 100 may obtain the information about the location of the home appliance 200 based on the measurement value for the distance between the mobile device 100 and the home appliance 200 and the measurement value for the direction. The information about the location of the home appliance 200 may include information about a relative position between the mobile device 100 and the home appliance 200. In addition, the information about the location of the home appliance 200 may include information about relative positions between the home appliances.

According to an embodiment, the information about the distance between the mobile device 100 and at least one home appliance may include at least one of a measurement value for a distance obtained by performing the ranging described above, a measurement value for a direction, or information about a location.

In operation S412, the mobile device 100 may identify at least one controllable home appliance based on the information about the distance.

According to an embodiment, the mobile device 100 may identify the home appliance 200 located within a certain distance from the mobile device 100 based on the information about the distance. The mobile device 100 may identify the identified home appliance 200 as a controllable home appliance. When there are a plurality of home appliances located within the distance from the mobile device 100, the mobile device 100 may identify each of the plurality of home appliances as a controllable electronic device. According to another embodiment, the mobile device 100 may identify the home appliance 200 located within a certain angle from a direction in which the mobile device 100 faces from among the plurality of home appliances located within the certain distance from the mobile device 100, as a controllable home appliance.

The mobile device 100 may control at least one controllable home appliance. For example, the mobile device 100 may display a UI for at least one controllable home appliance, and control the at least one controllable home appliance based on an input received through the UI. A method of the mobile device 100 controlling the home appliance is described in the description of FIG. 7.

According to an embodiment, in a state in which the power of the UWB communication module is on, when a state in which the magnitude of acceleration of the mobile device 100 close to 0 (for example, when the magnitude of acceleration is less than a threshold value close to 0) continues for a certain time or more, the mobile device 100 may turn off the UWB communication module. When the magnitude of acceleration is in a state of being close to 0, the mobile device 100 may not be used by a user. Thus, when the mobile device 100 is not in use, it is not necessary to perform ranging through UWB communication, and thus, power consumption may be reduced by turning off the UWB communication module. In a state in which the power of the UWB communication module is off, the mobile device 100 may perform again the operation from operation S402.

Figure 7:
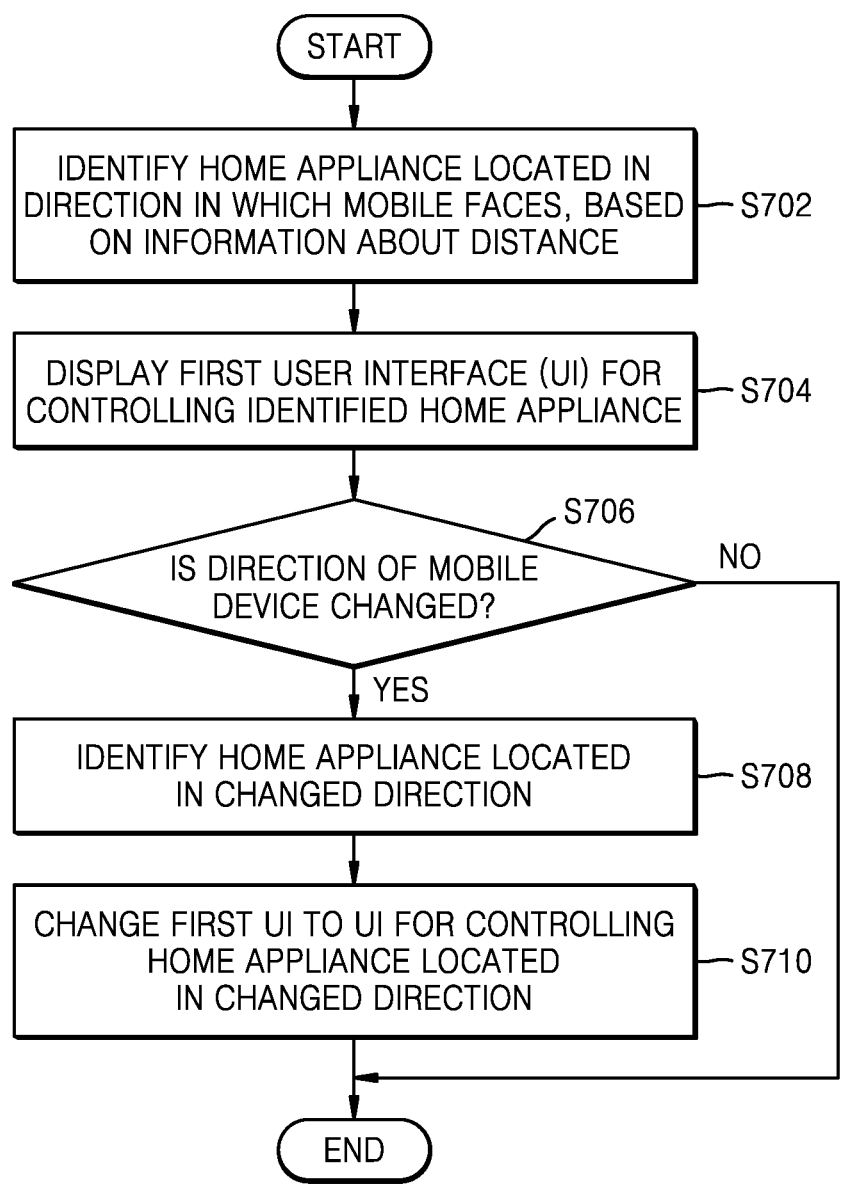
FIG. 7 is a flowchart of a method of displaying a user interface (UI) for a mobile device to control a home appliance, according to an embodiment of the disclosure.

FIG. 7 is a flowchart of a method of displaying a UI for a mobile device to control a home appliance, according to an embodiment of the disclosure.

In operation S702, the mobile device 100 may identify a first home appliance located in a direction in which the mobile device 100 faces from among at least one controllable home appliance, based on information about a distance. The at least one controllable home appliance corresponds to the at least one home appliance identified to be controllable in operation S412 of FIG. 4, and the information about the distance corresponds to the obtained information about the distance in operation S410.

According to an embodiment, the mobile device 100 may determine a direction in which the mobile device 100 is currently facing. Based on the information about the distance, the mobile device 100 may determine an angle within which the at least one controllable home appliance is located based on the direction in which the mobile device 100 faces. The mobile device 100 may identify a home appliance located within the smallest angle based on the direction in which the mobile device 100 faces from among the at least one controllable home appliance as a first home appliance located in the direction in which the mobile device 100 faces. In this case, when there are a plurality of home appliances located within the smallest angle, the mobile device 100 may identify home appliance at the closest distance from the mobile device 100 as the first home appliance located in the direction in which the mobile device 100 faces.

Figure 8A:
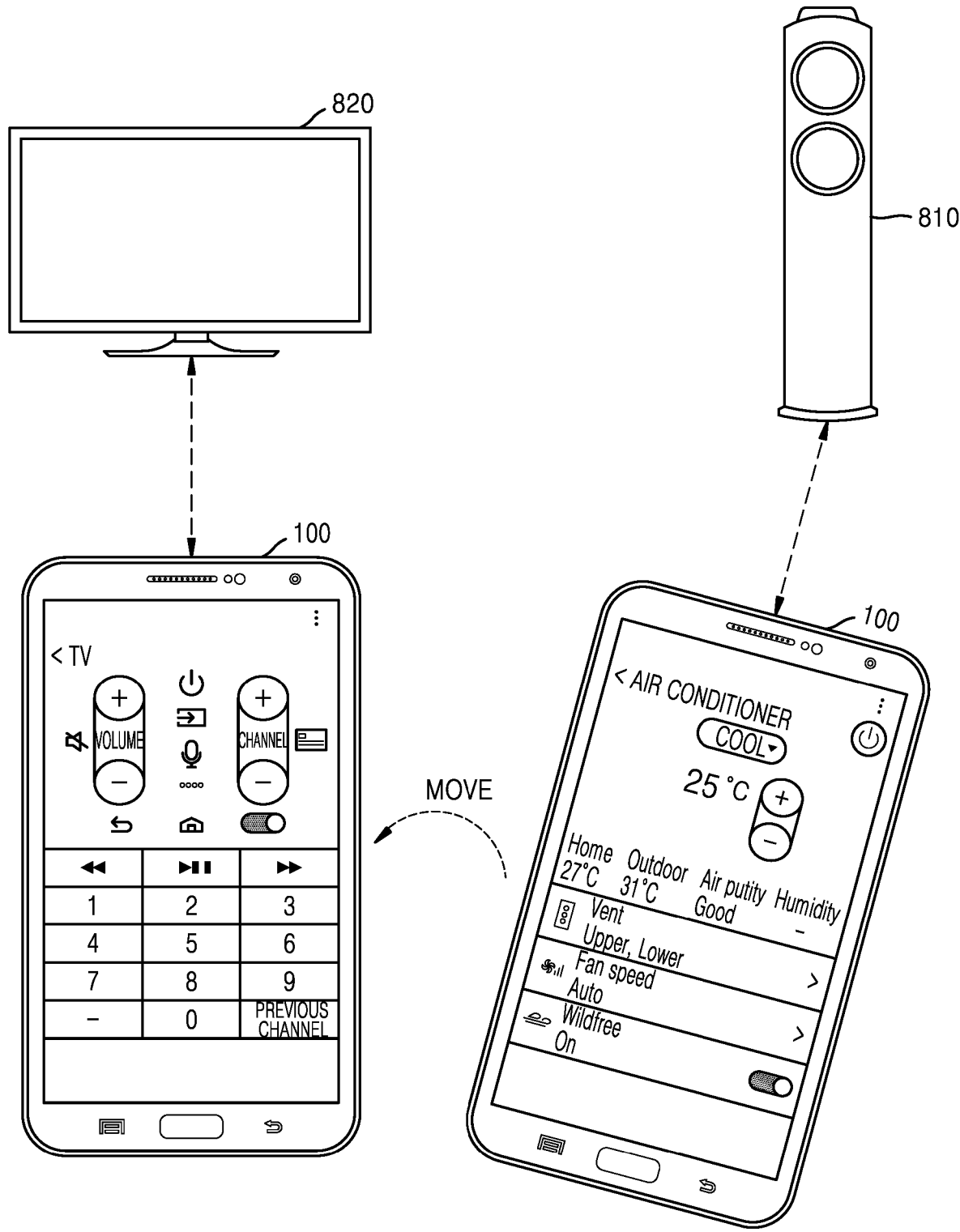
FIG. 8A is a diagram illustrating an example of a mobile device displaying a UI for controlling home appliances, according to an embodiment of the disclosure.
Figure 8B:
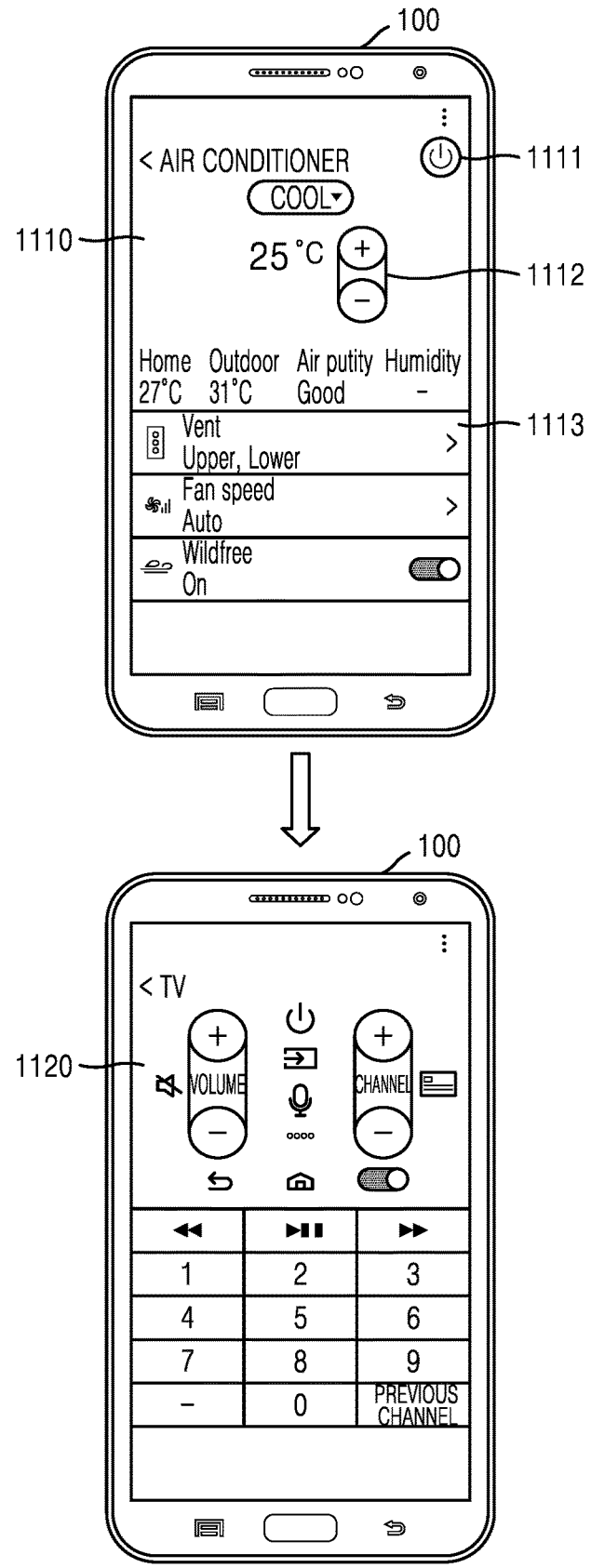
FIG. 8B is a diagram illustrating an example of a mobile device displaying a UI for controlling a home appliance, according to an embodiment of the disclosure.

FIGS. 8A and 8B illustrate an example of a case in which the mobile device 100 identifies an air conditioner 810 and a TV 820 as at least one controllable home appliance. The mobile device 100 may determine a direction in which the mobile device 100 is currently facing, and identify the air conditioner 810 as the first home appliance located in the determined direction based on information about a distance between the air conditioner 810 and the TV 820.

In operation S704, the mobile device 100 may display a first UI for controlling the first home appliance.

According to an embodiment, the mobile device 100 may control the first home appliance identified to be located in the direction in which the mobile device 100 faces. The mobile device 100 may display a UI used to control the first home appliance. The first UI for controlling the first home appliance may vary depending on the type of the first home appliance. For example, when the first home appliance is an air conditioner, the first UI for controlling the first home appliance may include UI elements for controlling a temperature, wind direction, reservation time, etc. of the air conditioner. The mobile device 100 may prestore the first UI for controlling the first home appliance. Alternatively, the mobile device 100 may receive, from the first home appliance or server, the first UI for controlling the first home appliance.

Referring again to FIG. 8B, the mobile device 100 may display a first UI 1110 for controlling the air conditioner 810 identified as the first home appliance. The first UI 1110 for controlling the air conditioner 810 may include a UI element 1111 for controlling power of the air conditioner 810, a temperature control UI element 1112, a wind direction control UI element 1113, etc.

In operation S706, the mobile device 100 may determine whether a direction in which the mobile device 100 faces is changed.

According to an embodiment, the mobile device 100 may determine whether the direction in which the mobile device 100 faces is changed, based on output values of an acceleration sensor, a gyro sensor, etc. When it is determined that the direction in which the mobile device 100 faces is not changed, the mobile device 100 may continuously display the first UI.

When it is determined that the direction in which the mobile device 100 faces is changed, the mobile device 100 may identify a home appliance located in the changed direction, in operation S708. The home appliance located in the changed direction may be one of the at least one home appliance identified to be controllable in operation S412. Alternatively, the home appliance located in the changed direction may be a home appliance that the mobile device 100 identifies as controllable by performing ranging again. A method of identifying the home appliance located in the changed direction may correspond to the method of identifying the first home appliance in operation S702.

In operation S710, the mobile device 100 may change the displayed first UI to a UI for controlling the home appliance located in the changed direction.

According to an embodiment, the mobile device 100 may display, in an area in which the first UI is displayed, the UI for controlling the home appliance located in the changed direction. The mobile device 100 may display, in the area in which the first UI is displayed, the UI for controlling the home appliance located in the changed direction instead of the first UI. Here, the area in which the first UI is displayed, may be an area preset as an area in which a UI for controlling the home appliance to be controlled by the mobile device 100 is displayed.

Regarding this, referring to FIG. 8A, the mobile device 100 may move from a direction facing the air conditioner 810 to a direction facing the TV 820. The mobile device 100 may identify the TV 820 as the home appliance located in the changed direction, and change the first UI 1110 for controlling the air conditioner 810 to a UI 1120 for controlling the TV 820, as shown in FIG. 8B. Through this, even when the mobile device 100 is moved, the mobile device 100 may easily control a home appliance located in a direction in which the mobile device 100 faces.

Figure 9:
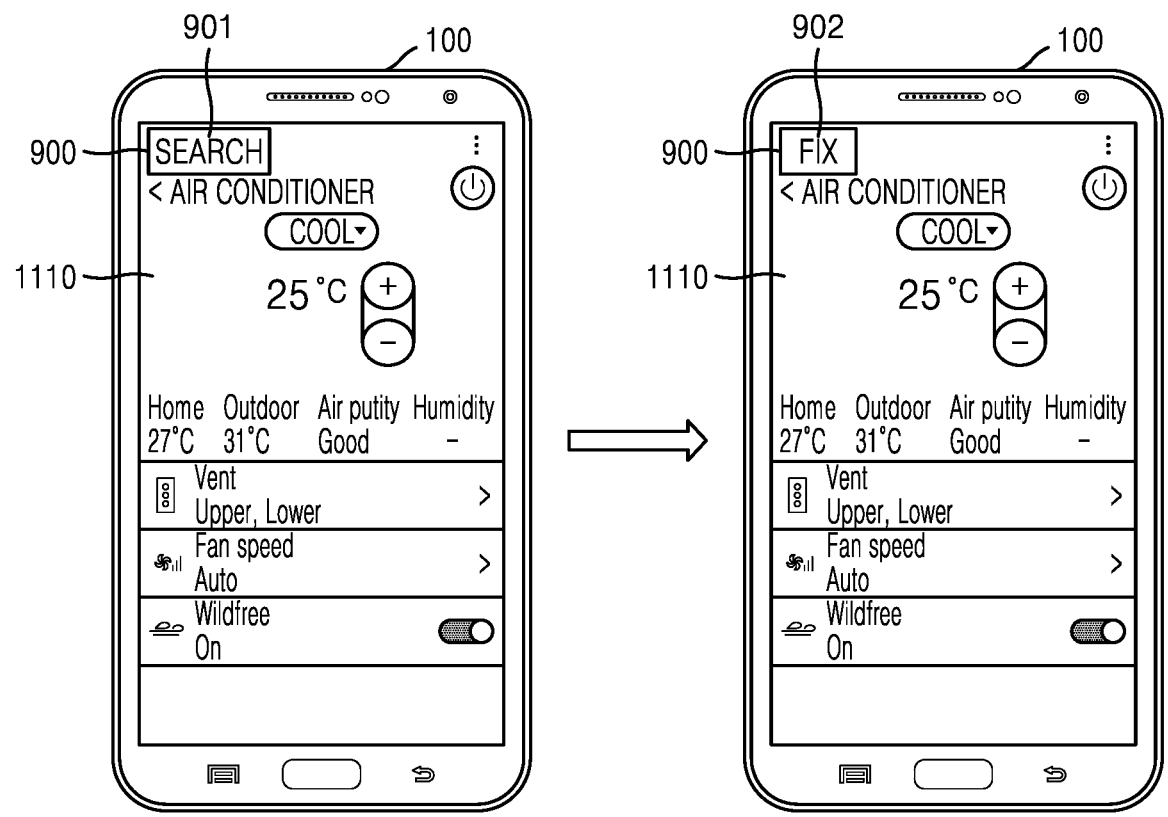
FIG. 9 is a diagram illustrating a method of a mobile device fixing, on a screen, a UI for controlling a home appliance, according to an embodiment of the disclosure.

FIG. 9 is a diagram illustrating a method of a mobile device fixing, on a screen, a UI for controlling a home appliance, according to an embodiment of the disclosure.

According to an embodiment, the mobile device 100 may display, in a first area of a screen of the mobile device 100, the first UI 1110 for controlling the first home appliance (for example, the air conditioner 810 in FIG. 8) identified to be located in the direction in which the mobile device 100 faces. Here, the first area may be an area in which a UI for controlling a home appliance to be controlled by using the mobile device 100 is displayed. The mobile device 100 may receive an input of fixing the displayed first UI 1110 to a partial area of the screen of the mobile device 100. When the mobile device 100 receives the input of fixing the first UI 1110 to the partial area of the screen of the mobile device 100, the first UI 1110 may be fixed and displayed on the partial area of the screen. Here, the screen of the mobile device 100 may be a screen such as a touchscreen or display of the mobile device 100.

According to an embodiment, the partial area to which the first UI 1110 is fixed may include a first area in which the first UI 1110 is currently displayed in the screen of the mobile device 100. Alternatively, the partial area to which the first UI 1110 is fixed may include a preset area on the screen of the mobile device 100. According to another embodiment, the first UI 1110 may be fixed and displayed on the entire area of the screen of the mobile device 100.

According to an embodiment, the first UI 1110 fixed to the partial area of the screen may not be changed to another UI until a release input is received. In other words, the mobile device 100 may fix and display the first UI 1110 on the partial area of the screen until a release input is received, and when the release input is received, the first UI 1110 may be changed to another UI. In a state in which the first UI 1110 is fixed, even when a direction in which the mobile device 100 faces is changed, the first UI 1110 is not changed to a UI for controlling a home appliance located in the changed direction and may be continuously displayed on the partial area of the screen. In a state in which the fixing of the first UI 1110 is released, when the direction in which the mobile device 100 faces is changed, the first UI 1110 may be changed to a UI for controlling a home appliance located in the changed direction, as in FIG. 8.

According to an embodiment, an input of fixing the first UI 1110 to a partial area of a screen of the mobile device 100 may include an input for a UI element displayed on the screen of the mobile device 100, a voice input, and a gesture input for moving the mobile device 100, etc. The mobile device 100 may be preset as to whether the first UI 1110 is fixed and displayed on the partial area of the screen when a voice input or gesture input is received, and the first UI 1110 may be fixed or unfixed depending on a voice or gesture input corresponding to fixation or release.

According to an embodiment, in a state in which the first UI 1110 is displayed in the first area, the mobile device 100 may display, on a screen, a UI fixing element 900 for fixing the first UI 1110 to a partial area of the screen, and receive, through the UI fixing element 900, an input of fixing the first UI 1110 to the partial area of the screen and a release input for releasing the fixation. When the first UI 1110 is not fixed to the partial area of the screen, information, such as "search" 901, indicating that the first UI 1110 may be changed to a UI for the mobile device 100 to control a found home appliance through UWB communication may be displayed on the UI fixing element 900. When the first UI 1110 is fixed to the partial area of the screen, information, such as "fix" 902, indicating that the first UI 1110 is not changed to another UI may be displayed on the UI fixing element 900. However, in the disclosure, information displayed on the UI fixing element 900 is not limited to "search" and "fix" described above and may include other terms or images representing search and fixation.

Whenever an input for the UI fixing element 900 is received, such as an input from ON/OFF button or an icon, the first UI 1110 displayed on the screen may be fixed or unfixed. For example, in a state in which the first UI 1110 is not fixed, when an input of fixing the first UI 1110 through the UI fixing element 900 displayed as "search" 901 is received, the UI fixing element 900 may be displayed as "fix" 902, and the first UI 1110 is fixed on a partial area of the screen of the first UI 1110.

According to an embodiment, when an input for controlling a first home appliance is received through the first UI 1110, the mobile device 100 may fix and display the first UI 1110 on the partial area of the screen. A situation in which an input for the first UI 1110 is received may be a situation in which the first home appliance is being controlled by using the mobile device 100. Accordingly, for the user inconvenience, when an input for the first UI 1110 is received, it is necessary to continuously display the first UI 1110, and to this end, the first UI 1110 may be fixed on the screen. In this case, when the first UI 1110 is fixed on the screen through the input for controlling the first home appliance, the first UI 1110 may be continuously displayed on the partial area of the screen, even when the direction in which the mobile device 100 faces is changed.

According to an embodiment, when an input for the first UI 1110 is not received for a certain time after the first UI 1110 is fixed on the screen, the mobile device 100 may release the fixation of the first UI 1110. A situation in which an input for the first UI 1110 is not received for a certain time may be a situation in which the first home appliance is not controlled by using the mobile device 100, and thus, when the state is changed to a state in which the first UI 1110 may be changed, home appliances may be controlled more flexibly by using the mobile device 100.

Figure 10:
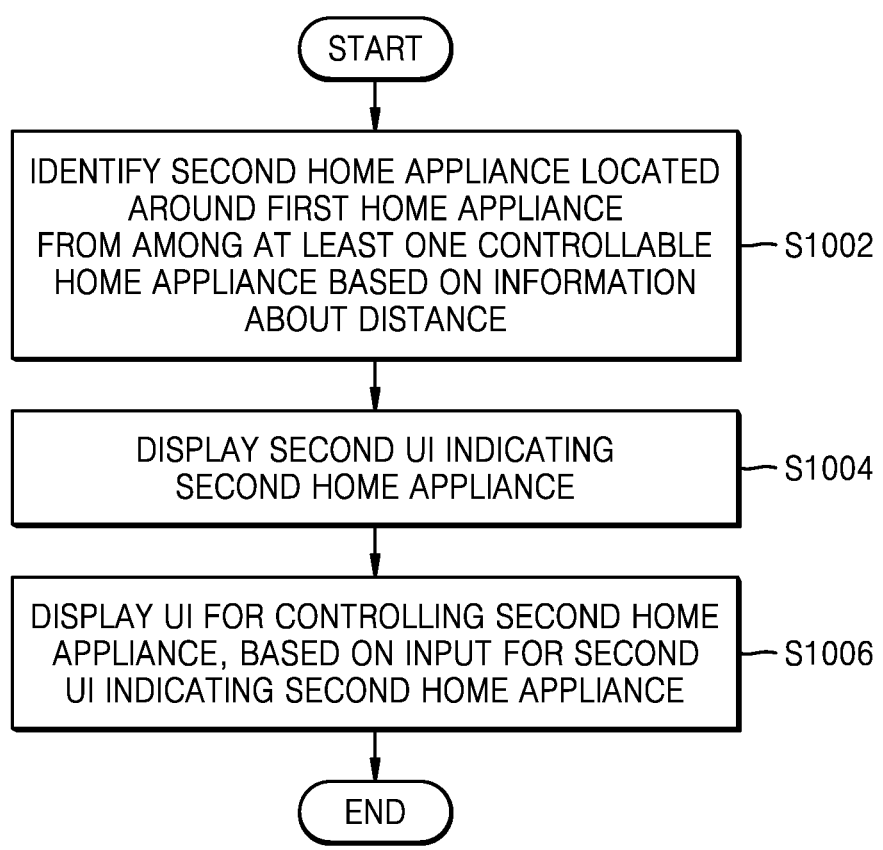
FIG. 10 is a flowchart of a method of a mobile device displaying UIs for controlling a home appliance, according to an embodiment of the disclosure.

FIG. 10 is a flowchart of a method of a mobile device displaying UIs for controlling a home appliance, according to an embodiment of the disclosure.

In operation S1002, the mobile device 100 may identify a second home appliance located around a first home appliance from among at least one controllable home appliance based on information about a distance. The at least one controllable home appliance corresponds to the at least one home appliance identified to be controllable in operation S412 of FIG. 4, and the information about the distance corresponds to the obtained information about the distance in operation S410.

According to an embodiment, the mobile device 100 may identify a distance between the first home appliance and another home appliance included in the at least one controllable home appliance based on the information about the distance. The mobile device 100 may sequentially list other home appliances included in the at least one controllable home appliance in order of proximity to the first home appliance. The mobile device 100 may identify the home appliance located closest to the first home appliance from among the at least one controllable home appliance as a second home appliance located around the first home appliance.

According to an embodiment, the mobile device 100 may identify a plurality of home appliances around the first home appliance based on the information about the distance. The mobile device 100 may identify a number of peripheral home appliances that are preset or set according to a user input. In this case, the home appliances may be identified as a list ordered according to specific conditions, such as order of proximity. For example, when the set number is 2, the mobile device 100 may identify two home appliances as peripheral home appliance in order of proximity to the first home appliance. In other words, the mobile device 100 may identify a third home appliance located closest to the first home appliance and a third home appliance located second closest to the first home appliance as peripheral home appliances. The list of identified home appliances may be updated according to conditions under which the list is created, when the direction in which the mobile device 100 faces changes as the mobile device 100 moves. According to the update of the list, the display of UIs may also be updated in an embodiment of the display of UIs described later.

According to another embodiment, the mobile device 100 may identify a home appliance located within a certain angle from a direction in which the mobile device 100 faces (e.g., a direction facing the first home appliance) as the second home appliance based on the information about the distance. For example, when the mobile device 100 faces the first home appliance, the mobile device 100 may identify a home appliance located within the smallest angle based on the direction facing the first home appliance as the second home appliance. In addition, the mobile device 100 may identify a plurality of home appliances located within a certain angle from the direction facing the first home appliance as peripheral home appliances located around the first home appliance.

In operation S1004, the mobile device 100 may display a second UI indicating the second home appliance.

According to an embodiment, the second UI indicating the second home appliance may include a term, an image, etc. that may identify the second home appliance. For example, when the second home appliance is a TV, the second UI may include the word "TV". Alternatively, the second UI may include an image for the TV. The second UI may be displayed separately on the screen in an area different from the first area where the first UI is displayed.

According to an embodiment, the mobile device 100 may display a UI indicating a plurality of home appliances around the first home appliance. For example, when the second home appliance and the third home appliance are identified as home appliances around the first home appliance, the mobile device 100 may display a second UI indicating the second home appliance and a third UI indicating the third home appliance. When the plurality of home appliances are identified as a list ordered according to specific conditions, the mobile device 100 may display UIs indicating the plurality of home appliances based on the list. For example, the UIs indicating the respective home appliances may be displayed according to the order of the list.

In operation S1006, the mobile device 100 may display a UI for controlling the second home appliance, based on an input for the second UI indicating the second home appliances.

According to an embodiment, the mobile device 100 may receive an input for the second UI. The input for the second UI may include a touch input, a drag input, etc. The mobile device 100 may display the UI for controlling the second home appliance on the screen based on the input for the second UI. For example, the UI for controlling the second home appliance may be displayed on the screen together with the first UI. When the UI for controlling the second home appliance is displayed with the first UI, a size of an area in which the first UI is displayed may be adjusted in the first area. In another example, the UI for controlling the second home appliance may be displayed instead of the first UI. In other words, based on the input for the second UI, the mobile device 100 may switch (or replace) the first UI with the UI for controlling the second home appliance. When the input for the second UI is a drag input, the mobile device 100 may display the UI for controlling the second home appliance in an area corresponding to a point (end point) where the drag input ends.

The embodiment described above may also be applied to even when there are a plurality of identified peripheral home appliances. For example, when the second UI indicating the second home appliance and the third UI indicating the third home appliance are displayed and the mobile device 100 receives an input for the third UI indicating the third home appliance, the mobile device 100 may display a UI for controlling the third home appliance.

According to an embodiment, when a direction in which the mobile device 100 faces is changed as the mobile device 100 moves, the mobile device 100 may display a UI indicating another home appliance instead of the second UI indicating the second home appliance. When the direction in which the mobile device 100 faces is changed, the mobile device 100 may change the first UI to a UI for controlling a home appliance located in the changed direction. Along with the above, the mobile device 100 may newly identify a peripheral home appliance of the home appliance located in the changed direction, and change the second UI to a UI indicating a UI indicating the newly-identified peripheral home appliance.

Figure 11:
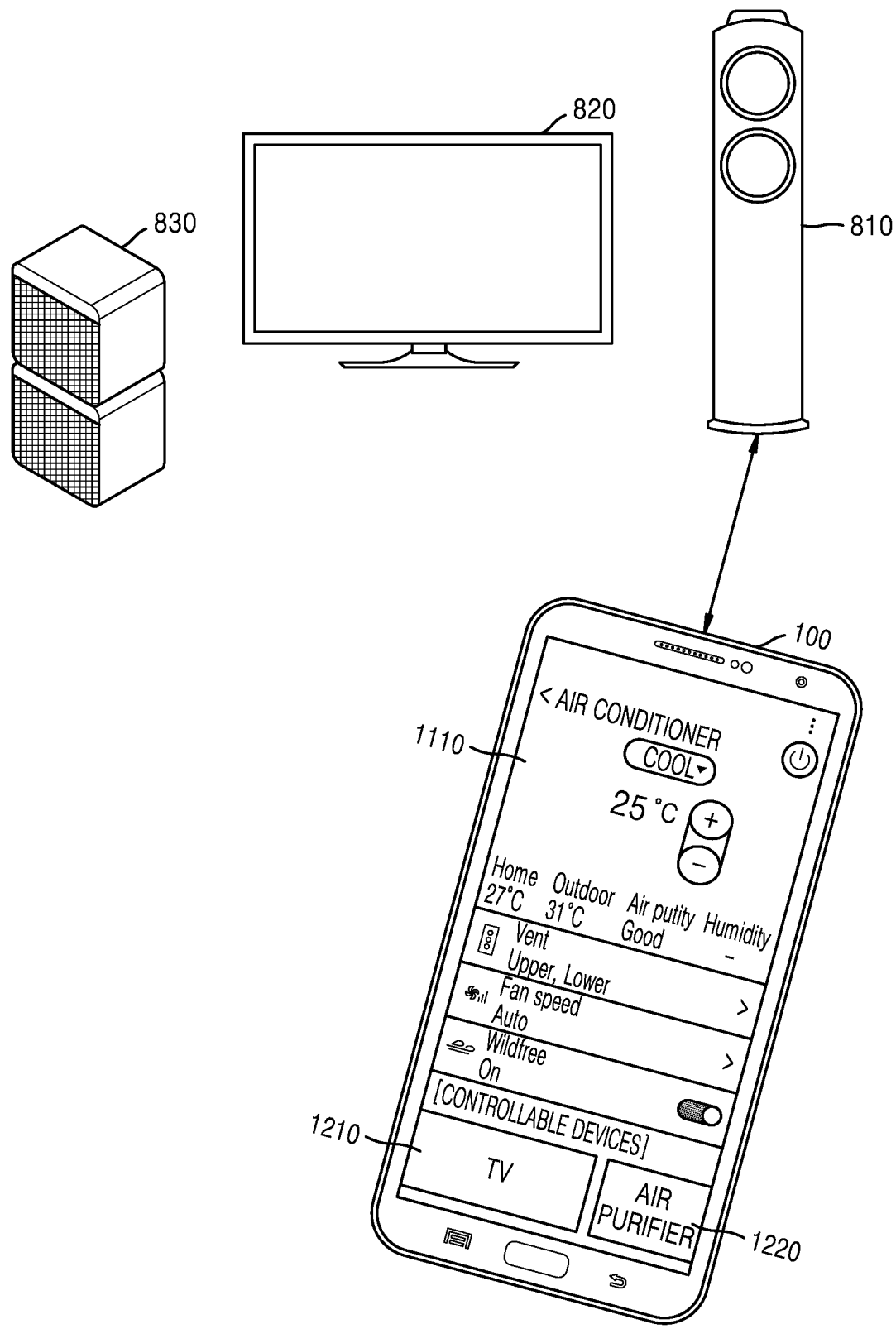
FIG. 11 is a diagram illustrating an example of a mobile device displaying UIs for controlling a home appliance, according to an embodiment of the disclosure.

FIG. 11 is a diagram illustrating an example of a mobile device displaying UIs for controlling a home appliance, according to an embodiment of the disclosure.

The mobile device 100 may identify the air conditioner 810, the TV 820, and an air purifier 830 as controllable home appliances. The mobile device 100 may identify that the air conditioner 810 is located in a direction in which the mobile device 100 faces, and display the first UI 1110 for controlling the air conditioner 810, on the screen. The mobile device 100 may identify the TV 820 and the air purifier 830 as peripheral home appliances located around the air conditioner 810, and display a second UI 1210 indicating the TV and a third UI 1220 indicating the air purifier 830.

The mobile device 100 may separately display the second UI 1210 and the third UI 1220 based on a relative distance between the air conditioner 810 and the other home appliances 820 and 830 located in the direction in which the mobile device 100 faces. For example, the mobile device 100 may display the second UI 1210, which indicates the TV 820 that is relatively closer to the air conditioner 810, with more emphasis than the third UI 1220. The mobile device 100 may display the second UI 1210 larger than the third UI 1220 or display the second UI 1210 by using a different color to emphasize the second UI 1210 more than the third UI 1220.

Figure 12:
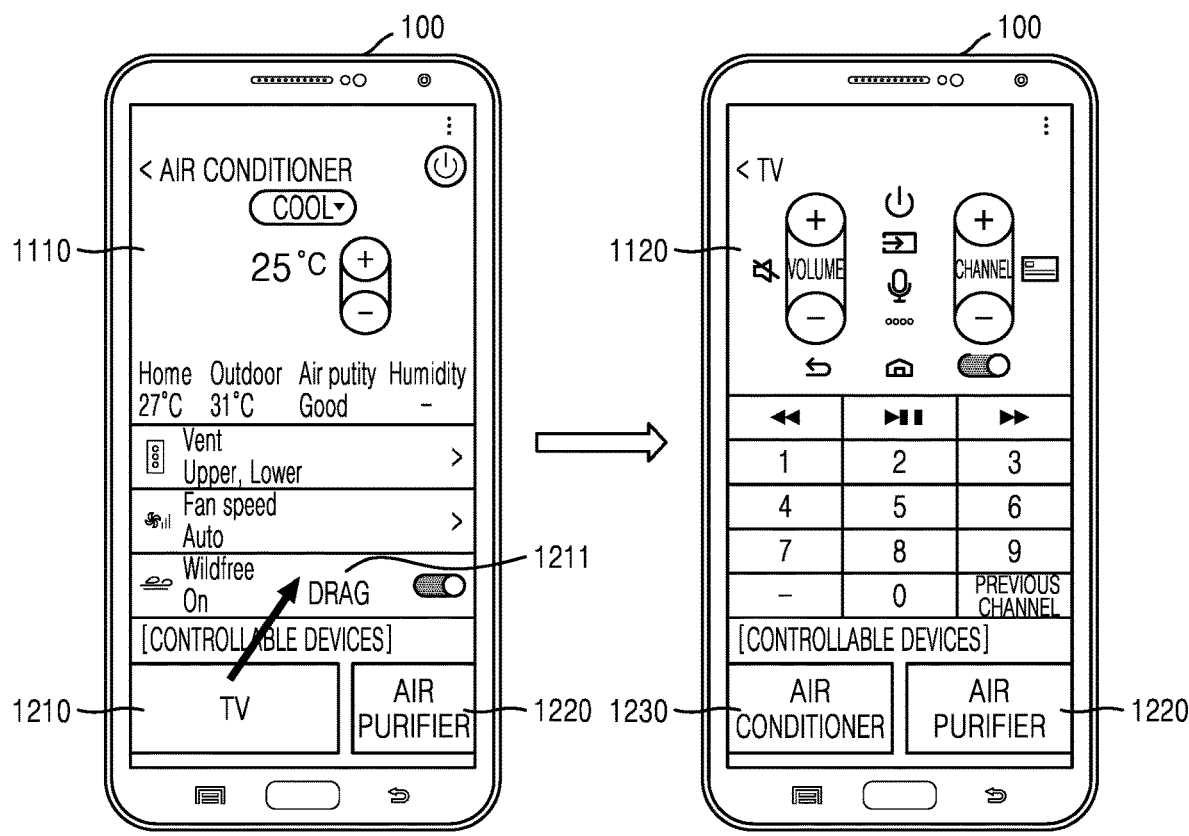
FIG. 12 is a diagram illustrating an example of a mobile device changing a UI for controlling a home appliance based on a drag input, according to an embodiment of the disclosure.

FIG. 12 is a diagram illustrating an example of a mobile device changing a UI for controlling a home appliance based on a drag input, according to an embodiment of the disclosure.

In FIG. 12, the mobile device 100 displays the first UI 1110, the second UI 1210, and the third UI 1220, as in FIG. 11. The mobile device 100 may receive a drag input 1211 for the second UI 1210. The drag input 1211 may start from the second UI 1210 and end at a first area corresponding to the first UI 1110.

According to the drag input 1211, the mobile device 100 may change the first UI 1110 for controlling the air conditioner 810 to the UI 1120 for controlling the TV 820. In addition, according to the drag input 1211, the mobile device 100 may not display the second UI 1210 indicating the TV 820, but may display a UI 1230 indicating the air conditioner 810. In this case, the UI 1230 indicating the air conditioner 810 and the third UI 1220 indicating the air purifier 830 may be displayed together, and a method of displaying the UI 1230 indicating the air conditioner 810 and the third UI 1220 may follow the example of separately displaying the second UI 1210 and the third UI 1220 of FIG. 11.

However, the disclosure is not limited to the example of FIG. 12, and includes an embodiment in which the mobile device 100 displays, according to a drag input, a UI for controlling a home appliance corresponding to the drag input together with a UI displayed on the screen. For example, according to the drag input 1211, the mobile device 100 may display the UI 1120 for controlling the TV 820 together with the first UI 1110 for controlling the air conditioner 810. In this case, the UI for controlling the home appliance corresponding to the drag input may be displayed to be located at the bottom of the previously displayed UI for controlling the home appliance.

Figure 13:
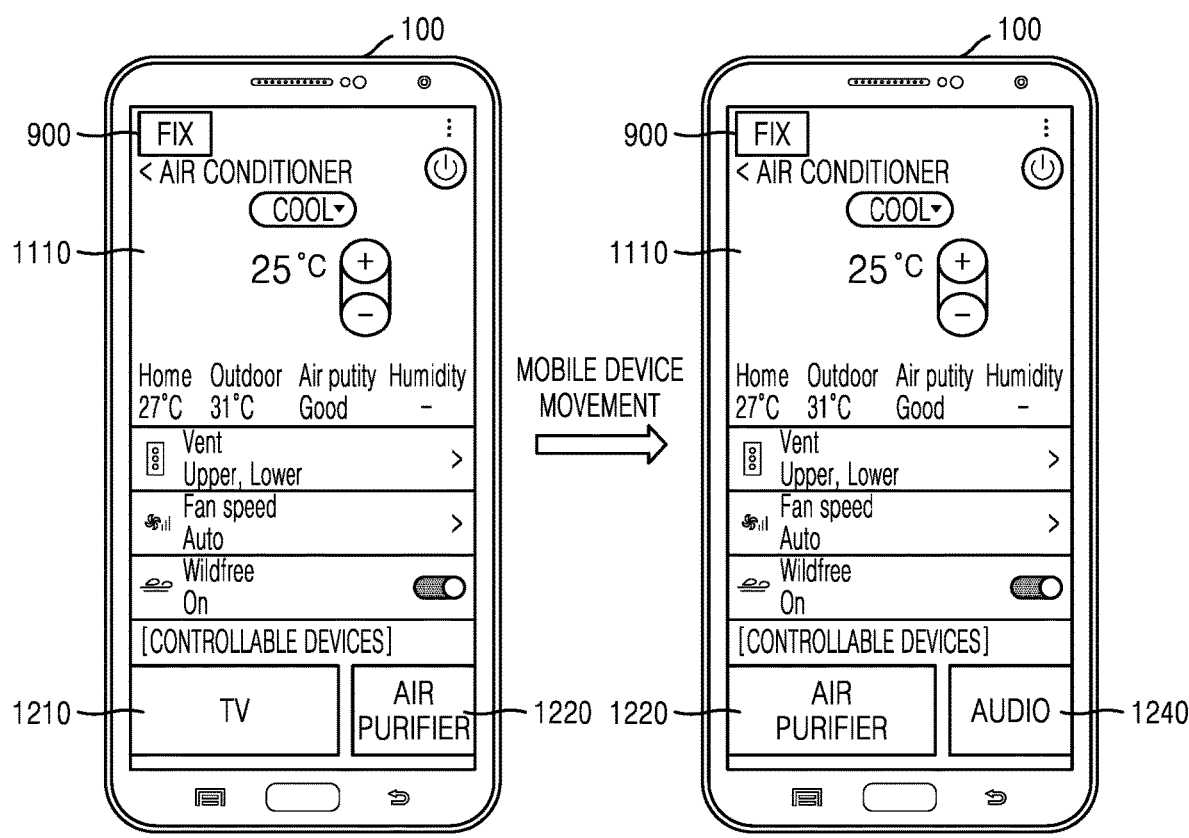
FIG. 13 is a diagram illustrating an example of a mobile device displaying UIs for controlling a home appliance, according to an embodiment of the disclosure.

FIG. 13 is a diagram illustrating an example of a mobile device displaying UIs for controlling a home appliance, according to an embodiment of the disclosure.

In FIG. 13, the mobile device 100 displays the first UI 1110, the second UI 1210, and the third UI 1220, as in FIG. 11. In FIG. 13, the first UI 1110 is fixed to the screen, unlike in FIG. 11. For example, the mobile device 100 may be in a state of displaying, on the screen, the UI fixing element 900 for fixing the first UI 1110 and fixing the first UI 1110 on the screen based on an input for the UI fixing element 900.

In this case, even when the direction in which the mobile device 100 faces is changed as the mobile device 100 moves, the first UI 1110 is not changed to another UI. According to an embodiment, when the first UI 1110 is fixed, the mobile device 100 may display a UI indicating a home appliance located within a certain angle based on the changed direction instead of a peripheral home appliance of the first home appliance corresponding to the first UI 1110. For example, when the mobile device 100 moves and the air purifier 830 and a stereo (not shown) are located within a certain angle from a direction in which the mobile device 100 faces, the mobile device 100 may display the third UI 1220 indicating the air purifier 830 and a UI 1240 indicating the stereo. Here, based on the direction in which the mobile device 100 faces, a UI indicating a home appliance located in a smaller angle may be displayed with greater emphasis. For example, when the mobile device 100 faces the air purifier 830, the third UI 1220 indicating the air purifier 830 may be displayed with greater emphasis than the UI 1240.

Figure 14:
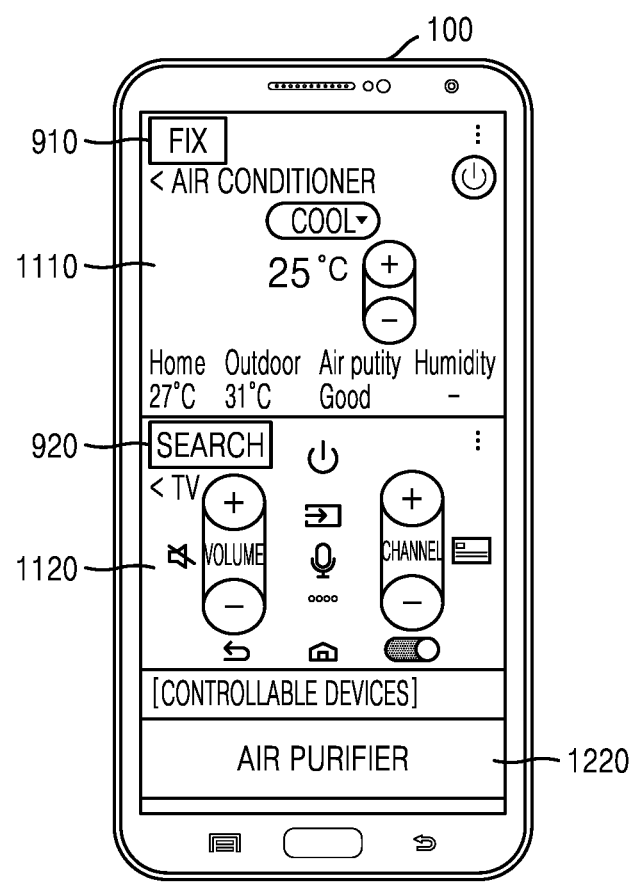
FIG. 14 is a diagram illustrating an example of a mobile device displaying UIs for controlling a home appliance, according to an embodiment of the disclosure.

FIG. 14 is a diagram illustrating an example of a mobile device displaying UIs for controlling a home appliance, according to an embodiment of the disclosure.

The mobile device 100 may display UIs for controlling a plurality of home appliances together. The mobile device 100 may identify a plurality of home appliances located in a direction in which the mobile device 100 faces. For example, in operation S702 in FIG. 7, the mobile device 100 may identify, based on information about a distance, a plurality of home appliances located within a certain angle based on the direction in which the mobile device 100 faces as home appliances located in the direction in which the mobile device 100 faces. For example, the mobile device 100 may identify the air conditioner 810 and the TV 820 as a plurality of home appliances located in the direction in which the mobile device 100 faces. In this case, the mobile device 100 may display the first UI 1110 for controlling the air conditioner 810 together with the UI 1120 for controlling the TV 820. In addition, the mobile device 100 may display the third UI 1220 indicating the air purifier 830 identified as a peripheral home appliance of the air conditioner 810 and the TV 820.

The mobile device 100 may individually fix the first UI 1110 for controlling the air conditioner and the UI 1120 for controlling the TV 820 on the screen. For example, the mobile device 100 may display each of a UI fixing element 910 for fixing the first UI 1110 and a UI fixing element 920 for fixing the UI 1120 for controlling the TV 820. In this case, when an input for the UI fixing element 910 for fixing the first UI 1110 is received and the first UI 1110 is fixed on the screen, the mobile device 100 may continuously display the first UI 1110 on the screen even when the direction in which the mobile device 100 faces changes. In this case, when the UI 1120 for controlling the TV 820 is not fixed, and apart from the first UI 1110, the UI 1120 for controlling the TV 820 may be changed to a UI for controlling another home appliance as the direction in which the mobile device 100 faces changes.

Figure 15:
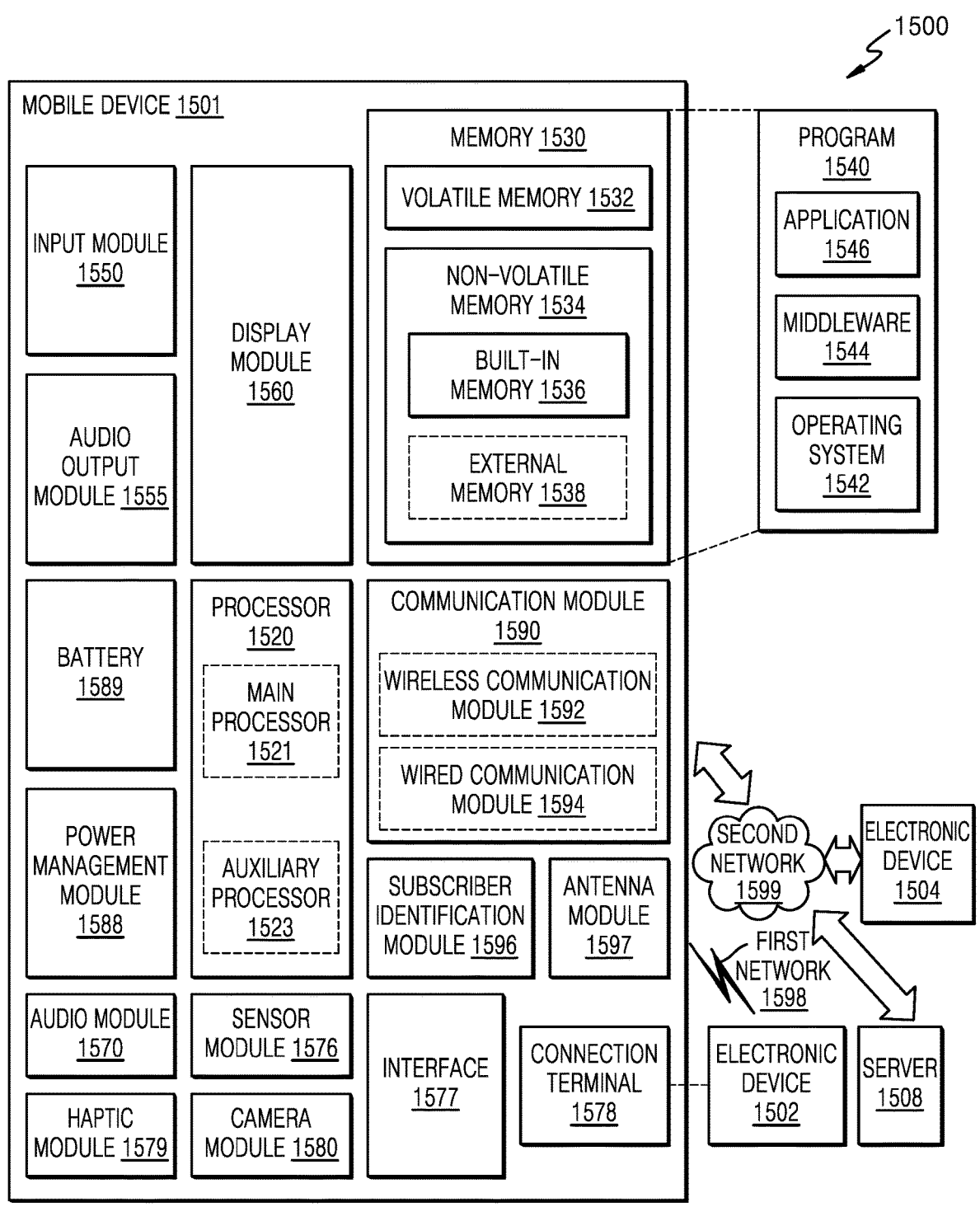
FIG. 15 is a block diagram illustrating a structure of a home appliance according to an embodiment of the disclosure.

FIG. 15 is a block diagram of a mobile device 1501 within a network environment 1500 according to various embodiments.

The mobile device 1501 in FIG. 15 may correspond to the mobile device 100 described in FIGS. 2 and 3. In addition, the processor 110 described in FIGS. 2 and 3 may correspond to a processor 1520, the communication module 120 described in FIGS. 2 and 3 may correspond to a communication module 1590, the sensor 150 described in FIGS. 2 and 3 may correspond to a sensor module 1576, and the power control unit 130 described in FIGS. 2 and 3 may correspond to a power management module 1588. In addition, the memory 140 described in FIGS. 2 and 3 may correspond to a memory 1530, and the input/output interface 160 described in FIG. 3 may correspond to an input module 1550, an audio output module 1555, a display module 1560, an audio module 1570, and a haptic module 1579. In addition, the home appliance 200 described in FIG. 2 may correspond to an electronic device 1502 or an electronic device 1504.

Referring to FIG. 15, in the network environment 1500, the mobile device 1501 may communicate with the electronic device 1502 through a first network (e.g., a short-range wireless communication network) 1598, or may communicate with at least one of the electronic device 1504 or server 1508 through a second network (e.g., long-distance wireless communication network) 1599. According to an embodiment, the mobile device 1501 may communicate with the electronic device 1504 through the server 1508. According to an embodiment, the mobile device 1501 may include the processor 1520, a memory 1530, the input module 1550, the display module 1560, the audio module 1570, the sensor module 1576, an interface 1577, a connection terminal 1578, the haptic module 1579, a camera module 1580, the power management module 1588, a battery 1589, the communication module 1590, a subscriber identification module 1596, or an antenna module 1597. In some embodiment, in the mobile device 1501, at least one of these components (e.g., the connection terminal 1578) may be omitted, or one or more other elements may be added. In some embodiments, some of these elements (e.g., the sensor module 1576, the camera module 1580, or the antenna module 1597) may be integrated into one element (e.g., the display module 1560).

For example, the processor 1520 may control at least one other element (e.g., hardware or software element) of the mobile device 1501 connected to the processor 1520 by executing software (e.g., a program 1540), and perform various data processing or calculations. According to an embodiment, as at least a part of data processing or calculation, the processor 1520 may store, in volatile memory 1532, commands or data received from another element (e.g., the sensor module 1576 or the communication module 1590), process the commands or data stored in the volatile memory 1532, and store resulting data in a non-volatile memory 1534. According to an embodiment, the processor 1520 may include a main processor 1521 (e.g., a central processing unit or an application processor) or an auxiliary processor 1523 which may operate independently from or together with the main processor 1521 (e.g., a graphics processing unit, a neural processing unit (NPU), an image signal processor, a sensor hub processor, or a communication processor). For example, when the mobile device 1501 includes the main processor 1521 and the auxiliary processor 1523, the auxiliary processor 1523 may be configured to use less power than the mobile device 1501 or to be specialized for a designated function. The auxiliary processor 1523 may be implemented separately from the main processor 1521 or as part of the main processor 1521.

For example, the auxiliary processor 1523 may control at least some of functions or states associated with at least one element (e.g., the display module 1560, the sensor module 1576, or the communication module 1590) from among the elements of the mobile device 1501 on behalf of the main processor 1521 while the main processor 1521 is in an inactive (e.g., sleep) state, or together with the main processor 1521 while the main processor 1521 is in an active (e.g., application execution) state. According to an embodiment, the auxiliary processor 1523 (e.g., an image signal processor or a communication processor) may be implemented as a part of another element (e.g., the camera module 1580 or the communication module 1590) functionally related thereto. According to an embodiment, the auxiliary processor 1523 (e.g., an NPU) may include a hardware structure specialized for processing an artificial intelligence model. The artificial intelligence model may be created through machine learning. For example, this learning may be performed in the mobile device 1501 itself on which the artificial intelligence model is performed, or may be performed through an additional server (e.g., the server 1508). A learning algorithm may include, for example, supervised learning, unsupervised learning, semi-supervised learning, or reinforcement learning, but is not limited to the examples described above. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-networks, or a combination of two or more of the above, but is not limited thereto. In addition to hardware structures, the artificial intelligence model may additionally or alternatively include software structures.

The memory 1530 may store various data used by at least one element (e.g., the processor 1520 or the sensor module 1576) of the mobile device 1501. The data may include, for example, software (e.g., the program 1540) and input data or output data for commands related thereto. The memory 1530 may include the volatile memory 1532 and the non-volatile memory 1534.

The program 1540 may be stored as software in the memory 1530 and may include, for example, an operating system 1542, middleware 1544, or an application 1546.

The input module 1550 may receive commands or data to be used in an element of the mobile device 1501 (e.g., the processor 1520) from the outside of the mobile device 1501 (e.g., a user). The input module 1550 may include, for example, a microphone, a mouse, a keyboard, a key (e.g., a button), or a digital pen (e.g., a stylus pen).

The audio output module 1555 may output acoustic signals to the outside of the mobile device 1501. The audio output module 1555 may include, for example, a speaker or receiver. The speaker may be used for general purposes such as multimedia playback or recording playback. The receiver may be used to receive incoming calls. According to an embodiment, the receiver may be implemented separately from the speaker or as a part thereof.

The display module 1560 may visually provide information to the outside of the mobile device 1501 (e.g., a user). For example, the display module 1560 may include a display, a hologram device, or a control circuit for controlling a projector and the corresponding device. According to an embodiment, the display module 1560 may include a touch sensor configured to detect a touch, or a pressure sensor configured to measure an intensity of force generated by the touch.

The audio module 1570 may convert sound into an electric signal or, conversely, convert an electrical signal into sound. According to an embodiment, the audio module 1570 may obtain sound through the input module 1550, or may output sound through the audio output module 1555 or an external electronic device directly or wirelessly connected to the mobile device 1501 (e.g., the electronic device 1502) (e.g., a speaker or headphone).

The sensor module 1576 may detect an operating state of the mobile device 1501 (e.g., power or temperature) or an external environment state (e.g., a user state), and generate an electrical signal or data value corresponding to the detected state. According to an embodiment, the sensor module 1576 may include, for example, a gesture sensor, a gyro sensor, an air pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 1577 may support one or more designated protocols that may be used for the mobile device 1501 to be directly or wirelessly connected to an external electronic device (e.g., the electronic device 1502). According to an embodiment, the interface 1577 may include, for example, a high definition multimedia interface (HDMI), a universal serial bus (USB) interface, an SD card interface, or an audio interface.

The connection terminal 1578 may include a connector through which the mobile device 1501 may be physically connected to an external electronic device (e.g., the electronic device 1502). According to an embodiment, the connection terminal 1578 may include, for example, an HDMI connector, a USB connector, an SD card connector, or an audio connector (e.g., a headphone connector).

The haptic module 1579 may convert an electrical signal into mechanical stimulus (e.g., vibration or movement) or electrical stimulation that may be recognized by the user through tactile or kinesthetic senses. According to an embodiment, the haptic module 1579 may include, for example, a motor, a piezoelectric element, or an electrical stimulation device.

The camera module 1580 may capture still images and moving images. According to an embodiment, the camera module 1580 may include one or more lenses, image sensors, image signal processors, or flashes.

The power management module 1588 may manage power supplied to the mobile device 1501. According to an embodiment, for example, the power management module 1588 may be implemented as at least a part of a power management integrated circuit (PMIC).

The battery 1589 may supply power to at least one element of the mobile device 1501. According to an embodiment, the battery 1589 may include, for example, a non-rechargeable primary cell, a rechargeable secondary cell, or a fuel cell.

The communication module 1590 may support establishment of a direct (e.g., wired) communication channel or wireless communication channel between the mobile device 1501 and an external electronic device (e.g., the electronic device 1502, the electronic device 1504, or the server 1508), and performance of communication through the established communication channel. The communication module 1590 may operate independently of the processor 1520 (e.g., an application processor) and may include one or more communication processors for supporting direct (e.g., wired) communication or wireless communication. According to an embodiment, the communication module 1590 may include a wireless communication module 1592 (e.g., a cellular communication module, a near field communication module, or a GNSS communication module) or a wired communication module 1594 (e.g., a LAN communication module or a power line communication module). Among these communication modules, the corresponding communication module may communicate with the external electronic device 1504 through a first network 1598 (e.g., a short-range communication network such as Bluetooth, wireless fidelity (WiFi) direct, or infrared data association (IrDA)) or a second network 1599 (e.g., a long-distance communication network such as a legacy cellular network, a 5G network, a next-generation communication network, the Internet, or a computer program (e.g., LAN or WAN)). These various types of communication modules may be integrated into one element (e.g., a single chip) or may be implemented as a plurality of separate elements (e.g., a plurality of chips). The wireless communication module 1592 may identify or authenticate the mobile device 1501 within a communication network such as the first network 1598 or second network 1599 by using subscriber information (e.g., International Mobile Subscriber Identifier (IMSI)) stored in the subscriber identification module 1596.

The wireless communication module 1592 may support 5G networks and next-generation communication technologies after 4G networks, for example, new radio (NR) access technology. The NR access technology may support high-speed transmission of high-capacity data (enhanced mobile broadband (eMBB)), minimization of terminal power and access to a plurality of terminals (massive machine type communications (mMTC)), or high reliability and low latency (ultra-reliable and low-latency communications (URLLC)). For example, the wireless communication module 1592 may support a high frequency band (e.g., mmWave bands) to achieve high data rates. The wireless communication module 1592 may support various technologies to ensure performance in high frequency bands, for example, technologies such as beamforming, massive multiple-input and multiple-output (MIMO)), full dimensional MIMO (FD-MIMO), array antenna, analog beam-forming, or large scale antenna. The wireless communication module 1592 may support various requirements specified in the mobile device 1501, an external electronic device (e.g., the electronic device 1504), or a network system (e.g., the second network 1599). According to an embodiment, the wireless communication module 1592 may support a peak data rate (e.g., 20 Gbps or more) for realizing eMBB, loss overage (e.g., 164 dB or less) for realizing mMTC, or U-plane latency (e.g., 0.5 ms or less for downlink (DL) and uplink (UL) or 1 ms or less for round trip) for realizing URLLC.

The antenna module 1597 may transmit or receive signals or power to or from the outside (e.g., an external electronic device). According to an embodiment, the antenna module 1597 may include an antenna including a radiator including a conductor or conductive pattern formed on a substrate (e.g., a printed circuit board (PCB)). According to an embodiment, the antenna module 1597 may include a plurality of antennas (e.g., array antennas). In this case, for example, at least one antenna suitable for a communication scheme used in a communication network such as the first network 1598 or second network 1599 may be selected from the plurality of antennas by the communication module 1590. Signals or power may be transmitted or received between the communication module 1590 and an external electronic device through the at least one selected antenna.

According to some embodiments, in addition to the radiator, other components (e.g., a radio frequency integrated circuit (RFIC)) may be additionally formed as a part of the antenna module 1597.

According to various embodiments, the antenna module 1597 may form an mmWave antenna module. According to an embodiment, the mmWave antenna module may include a printed circuit board, an RFIC arranged on or adjacent to a first surface (e.g., bottom side) of the printed circuit board and capable of supporting a designated frequency band (e.g., mmWave band), and a plurality of antennas (e.g., array antennas) arranged on or adjacent to a second surface (e.g., top surface or lateral side) of the printed circuit board and capable of transmitting or receiving signals in the designated frequency band.

At least some of the elements may be connected through a communication method between peripheral devices (e.g., bus, general purpose input and output (GPIO), serial peripheral interface (SPI), or mobile industry processor interface (MIPI), and may exchange signals (e.g., commands or data) with each other.

According to an embodiment, the command or data may be transmitted or received between the mobile device 1501 and the external electronic device 1504 through the server 1508 connected to the second network 1599. Each of the external electronic devices 1502 or 1504 may be the same or different type of device as or from the mobile device 1501. According to an embodiment, all or some of operations executed in the mobile device 1501 may be executed in one or more external electronic devices from among the external electronic devices 1502, 1504, or 1508. For example, when the mobile device 1501 must perform a function or service automatically or in response to a request from a user or another device, the mobile device 1501 may request, instead of executing the function or service in itself, or additionally, one or more external electronic devices to perform at least a part of the function or service. The one or more external electronic devices receiving the request may execute at least a part of the requested function or service, or an additional function or service related to the request, and transmit a result of the execution to the mobile device 1501. The mobile device 1501 may process the result as is or additionally and provide the result as at least a part of a response to the request. To this end, for example, cloud computing, distributed computing, mobile edge computing (MEC), or client-server computing technology may be used. The mobile device 1501 may provide an ultra-low latency service by using, for example, distributed computing or mobile edge computing. In another embodiment, the external electronic device 1504 may include an Internet of Things (IoT) device. The server 1508 may be an intelligent server using machine learning and/or neural networks. According to an embodiment, the external electronic device 1504 or server 1508 may be included in the second network 1599. The mobile device 1501 may be applied to intelligent services (e.g., smart home, smart city, smart car, or healthcare) based on 5G communication technology and IoT-related technology.

Figure 16:
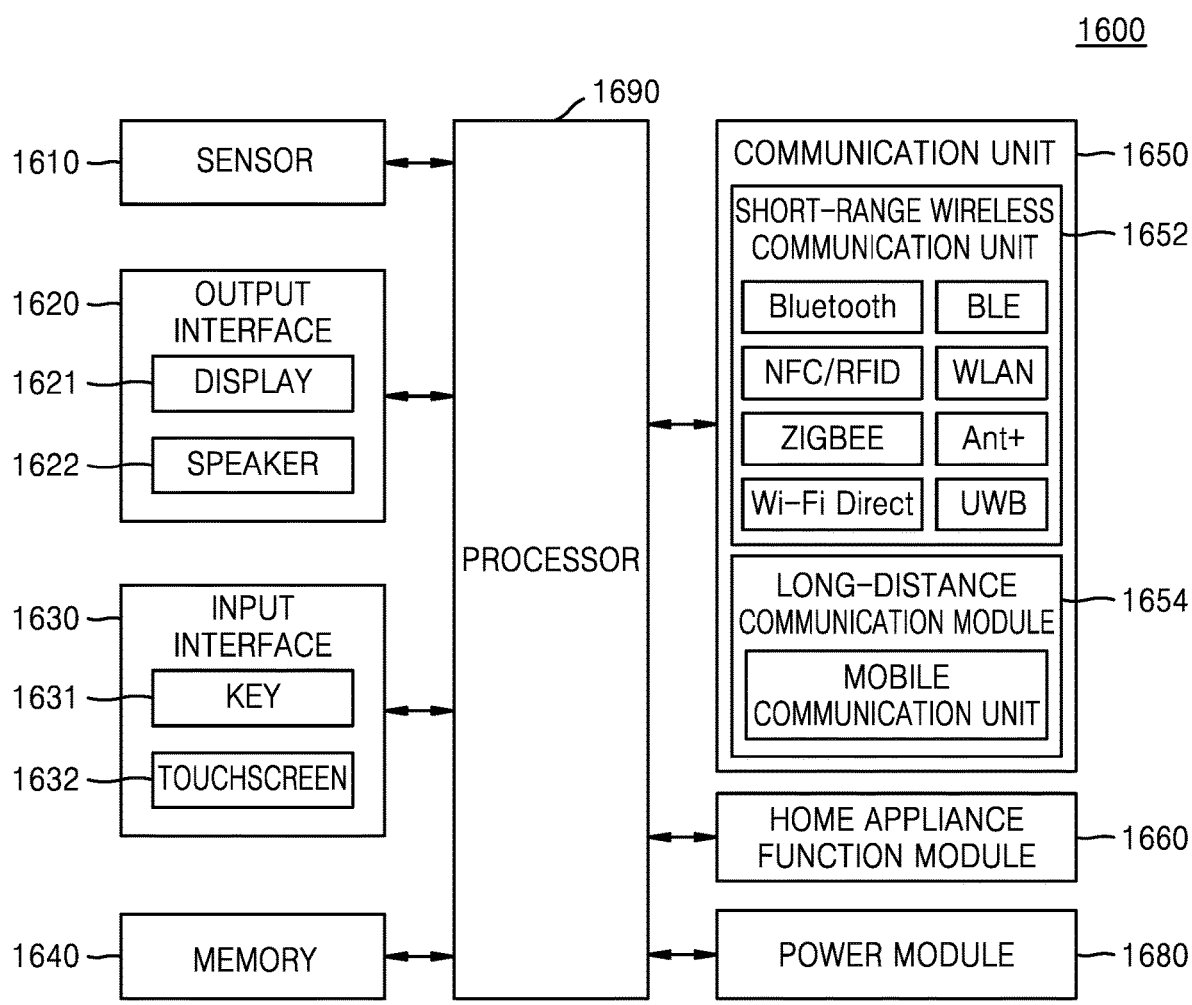
FIG. 16 is a block diagram of a mobile device within a network environment according to various embodiments.

FIG. 16 is a block diagram illustrating a structure of a home appliance according to an embodiment of the disclosure.

The home appliance 200 according to an embodiment of the disclosure may correspond to a home appliance 1600. The home appliance 1600 according to an embodiment of the disclosure may include a sensor 1610, an output interface 1620, an input interface 1630, a memory 1640, a communication module 1650, a home appliance function module 1660, a power module 1680, and a processor 1690. The home appliance 1600 may include various combinations of the elements shown in FIG. 16, and not all of the elements shown in FIG. 16 are essential.

The home appliance 1600 in FIG. 16 corresponds to the home appliance 200 described in FIG. 2, the memory 1640 corresponds to the memory 230 described in FIG. 2, the processor 1690 corresponds to the processor 210 described in FIG. 2, and the communication module 1650 corresponds to the communication module 220 described in FIG. 2.

The sensor 1610 may include various types of sensors, and for example, the sensor 1610 may include various types of sensors, including an image sensor, an infrared sensor, an ultrasonic sensor, a LIDAR sensor, a human detection sensor, a motion detection sensor, a proximity sensor, and an illumination sensor. Because a function of each of the sensors may be intuitively deduced by a person skilled in the art from the name thereof, detailed descriptions thereof are omitted.

The output interface 1620 may include a display 1616, a speaker 1622, etc. The output interface 1620 may output various notifications, messages, information, etc. generated by the processor 1690.

The input interface 1630 may include a key 1631, a touchscreen 1632, etc. The input interface 1630 may receive a user input and transfer the user input to the processor 1690.

The memory 1640 may store various information, data, instructions, programs, etc. necessary for an operation of the home appliance 1600. The memory 1640 may include at least one of volatile memory or non-volatile memory, or a combination thereof. The memory 1640 may include at least one type of storage medium from among a flash memory type, a hard disk type, a multimedia card microtype, a card-type memory (for example, SD or XD memory, etc.), RAM, SRAM, ROM, EEPROM, PROM, magnetic memory, magnetic disk, and an optical disk. In addition, the home appliance 1600 may operate a web storage or cloud server performing a storage function on the Internet.

The communication module 1650 may include at least one of a short-range wireless communication module 1652 or a long-distance communication module 1654, or a combination thereof. The communication module 1650 may include at least one antenna for wirelessly communicating with other devices.

The short-range wireless communication module 1652 may include a Bluetooth communication module, a BLE communication module, a near field communication module, a WLAN (WiFi) communication module, a Zigbee communication module, an IrDA communication module, a WFD communication module, a UWB communication module, an Ant+ communication module, a microwave (uWave) communication module, etc., but is not limited thereto.

The long-distance communication module 1654 may include a communication module for performing various types of long-distance communications, and may include a mobile communication unit. The mobile communication unit may transmit or receive wireless signals to or from at least one of a base station, an external terminal, or a server. Here, the wireless signal may include various types of data according to voice call signals, video call signals, or text/multimedia message transmission and reception.

The home appliance function module 1660 may include an operation module for performing an original function of the home appliance function module 1660. When the home appliance 1600 corresponds to a washing machine, the home appliance function module 1660 may include a laundry module. The laundry module may include a washing tub, a water supply unit, a drain unit, a motor, a door, a detergent inlet, etc. When the home appliance 1600 corresponds to a refrigerator, the home appliance function module 1660 may include a refrigeration/freezing module. The refrigeration/freezing module may include a container, a cooler, door, a temperature sensor, etc. When the home appliance 1600 corresponds to a dryer, the home appliance function module 1660 may include a drying module. The drying module may include a laundry container, a motor, a dehumidifier, a drain unit, a door, a dust filter, a condenser, etc. When the home appliance 1600 corresponds to a cleaning module, the home appliance function module 1660 may include a cleaning module. The cleaning module may include a vacuum suction unit, a dust bin, a filter, a dust transfer pipe, etc.

The processor 1690 may control an overall operation of the home appliance 1600. The processor 1690 may control elements of the home appliance 1600 by executing a program stored in the memory 1640.

According to an embodiment of the disclosure, the processor 1690 may include a separate NPU for performing an operation of a machine learning model. In addition, the processor 1690 may include a central processing unit (CPU), a graphics processing unit (GPU), etc.

The term "module" used in various embodiments of the present document may include a unit implemented in hardware, software, or firmware, and may be interchangeably used with terms such as logic, logic block, component, or circuit, for example. The module may be an integrally configured component, a minimum unit of the component or a part thereof performing one or more functions. For example, according to an embodiment, the module may be implemented in the form of an application-specific integrated circuit (ASIC).

Various embodiments of the present document may be implemented as software (e.g., a program) including one or more instructions stored in a storage medium that may be read by a machine (e.g., the mobile device 110 or home appliance 100). For example, a processor of the machine (the mobile device 110 or home appliance 100) may call at least one command from among one or more instructions stored from a storage medium and execute the command. This allows the machine to be operated to perform at least one function according to the at least one called instruction. The one or more instructions may include code generated by a compiler or code that may be executed by an interpreter. A machine-readable storage medium may be provided in a form of a non-transitory storage medium. Here, the "non-transitory storage medium" only denotes a tangible device and does not contain a signal (for example, electromagnetic waves). This term does not distinguish a case where data is stored in the storage medium semi-permanently and a case where the data is stored in the storage medium temporarily. For example, the "non-transitory storage medium" may include a buffer where data is temporarily stored.

According to an embodiment, a method according to various embodiments disclosed in the present specification may be provided by being included in a computer program product. The computer program products are products that can be traded between sellers and buyers. The computer program product may be distributed in a form of machine-readable storage medium (for example, a compact disc read-only memory (CD-ROM)), or distributed (for example, downloaded or uploaded) through an application store (for example, Play Store™) or directly or online between two user devices (for example, smart phones). In the case of online distribution, at least a part of the computer program product may be temporarily stored or temporarily generated in the machine-readable storage medium such as a server of a manufacturer, a server of an application store, or a memory of a relay server.

According to various embodiments, each element (e.g., module or program) of the elements described above may include a single or plural entities, and some of the plurality of entities may be separately arranged in other elements. According to various embodiments, one or more elements or operations of the corresponding elements described above may be omitted, or one or more other elements or operations may be added. Alternatively or additionally, a plurality of elements (e.g., modules or programs) may be integrated into one element. In this case, the integrated element may perform one or more functions of each element of the plurality of elements in the same or similar manner as those performed by the corresponding element from among the plurality of elements prior to the integration. Operations performed by modules, programs, or other components, according to various embodiments, may be sequentially, parallel, repetitively or heuristically executed, at least one of the operations may be executed in a different order or omitted, or one or more other operations may be added.

The invention claimed is:

1. A method of controlling a mobile device, the method comprising:
    determining, based on a sensing value of an acceleration sensor of the mobile device, a state of the mobile device;
    controlling a power of an ultrawide band (UWB) communication module based on the state of the mobile device;
    determining, a ranging interval between times the mobile device performs ranging based on the sensing value of the acceleration sensor of the mobile device;
    obtaining a distance between the mobile device and at least one home appliance by performing the ranging through the UWB communication module based on the ranging interval; and
    identifying at least one home appliance that is controllable based on the distance between the mobile device and the at least one home appliance.

2. The method of claim 1, wherein the determining the state of the mobile device comprises determining the state of the mobile device based on an output obtained from a model trained with, as an input data, the sensing value of the acceleration sensor of the mobile device.

3. The method of claim 1, wherein the state of the mobile device is one of a moving state, a vibration state, or a stationary state, and
    the controlling of the power of the UWB communication module comprises turning on the power of the UWB communication module based on the state of the mobile device being the moving state or the vibration state.

4. The method of claim 3, further comprising:
    changing a turned-on mode of the UWB communication module to a power saving mode based on the state of the mobile device being the vibration state.

5. The method of claim 1, wherein the determining of the ranging interval between the times the mobile device performs ranging based on the sensing value of the acceleration sensor of the mobile device comprises:
    determining the ranging interval such that the faster the mobile device moves, the shorter the ranging interval becomes, based on the sensing value of the acceleration sensor of the mobile device.

6. The method of claim 1, further comprising:
identifying, based on the distance, a first home appliance located along a direction in which the mobile device faces from among the at least one home appliance; and
displaying a first user interface (UI) to control the first home appliance.

7. The method of claim 6, wherein the direction in which the mobile device is a first direction, and the method further comprises:
identifying, based on the first direction in which the mobile device faces changing to a second direction, a home appliance located along the second direction; and
changing the displayed first UI to a second UI to control the home appliance located along the second direction.

8. The method of claim 6, further comprising comprising:
receiving an input to fix the displayed first UI on a partial area of a screen,
wherein the first UI fixed on the partial area of the screen is unchanged to another UI until a release input is received.

9. The method of claim 6, further comprising:
identifying, based on the distance, a second home appliance located around the first home appliance from among the at least one home appliance; and
displaying a second UI indicating the second home appliance.

10. The method of claim 9, further comprising:
displaying a UI to control the second home appliance, based on receiving an input through the second UI indicating the second home appliance.

11. A mobile device comprising:
a communication module including an ultrawide band (UWB) communication module;
an acceleration sensor;
a memory to store at least one instruction; and
at least one processor to execute the at least one instruction, individually or collectively, to cause the mobile device to:
determine based on a sensing value of an acceleration sensor of the mobile device, a state of the mobile device;
control power of the UWB communication module based on the state of the mobile device;
determine a ranging interval between times the mobile device performs ranging based on the sensing value of the acceleration sensor of the mobile device;
obtain a distance between the mobile device and at least one home appliance by performing the ranging through the UWB communication module based on the ranging interval; and
identify at least one home appliance that is controllable based on the distance between the mobile device and at least one home appliance.

12. The mobile device of claim 11, wherein the at least one instruction further causes the mobile device to: determine the state of the mobile device based on an output obtained from a model trained with, as an input data, the sensing value of the acceleration sensor of the mobile device.

13. The mobile device of claim 11, wherein the state of the mobile device is one of a moving state, a vibration state, or a stationary state, and
the at least one instruction further causes the mobile device to turn on the power of the UWB communication module based on the state of the mobile device being the moving state or vibration state.

14. The mobile device of claim 13, wherein the at least one instruction further causes the mobile device to change a turned-on mode of the UWB communication module to a power saving mode based on the state of the mobile device being the vibration state.

15. A non-transitory computer-readable recording medium having recorded thereon a computer program for performing, on a computer, a method of controlling a mobile device, the method comprising:
determining, based on a sensing value of an acceleration sensor of the mobile device, a state of the mobile device;
controlling a power of an ultrawide band (UWB) communication module based on the state of the mobile device;
determining a ranging interval between times the mobile device performs ranging based on the sensing value of the acceleration sensor of the mobile device;
obtaining a distance between the mobile device and at least one home appliance by performing the ranging through the UWB communication module based on the ranging interval; and
identifying at least one home appliance that is controllable based on the distance between the mobile device and the at least one home appliance.

16. The mobile device of claim 11, the at least one instruction further causes the mobile device to:
determine the ranging interval such that the faster the mobile device moves, the shorter the ranging interval becomes, based on the sensing value of the acceleration sensor of the mobile device.

17. The mobile device of claim 11, the at least one instruction further causes the mobile device to:
identify, based on the distance between the mobile device and the at least one home appliance, a first home appliance located along a direction in which the mobile device faces from among the at least one controllable home appliance, and
display a first user interface (UI) to control the first home appliance.

18. The mobile device of claim 17, wherein the direction in which the mobile device is a first direction, and the at least one instruction further causes the mobile device to:
identify, based on the first direction in which the mobile device faces changing to a second direction, a home appliance located along the second direction, and
change the displayed first UI to a second UI to control the home appliance located along the second direction.

19. The mobile device of claim 17, the at least one instruction further causes the mobile device to:
receive an input to fix the displayed first UI on a partial area of a screen,
wherein the first UI fixed on the partial area of the screen is unchanged to another UI until a release input is received.

20. The mobile device of claim 17, the at least one instruction further causes the mobile device to:
identify, based on the distance between the mobile device and the at least one home appliance, a second home appliance located around the first home appliance from among the at least one controllable home appliance, and
display a second UI indicating the second home appliance.

* * * * *